US012677240B2

(12) United States Patent
Zhang et al.

(10) Patent No.: US 12,677,240 B2
(45) Date of Patent: Jul. 7, 2026

(54) PRS RESOURCE DETERMINATION METHOD AND APPARATUS

(71) Applicant: DATANG MOBILE COMMUNICATIONS EQUIPMENT CO., LTD., Beijing (CN)

(72) Inventors: Bufang Zhang, Beijing (CN); Jianxiang Li, Beijing (CN); Dajun Zhang, Beijing (CN); Haiyang Quan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 335 days.

(21) Appl. No.: 18/553,209

(22) PCT Filed: Mar. 31, 2022

(86) PCT No.: PCT/CN2022/084550
§ 371 (c)(1),
(2) Date: Sep. 29, 2023

(87) PCT Pub. No.: WO2022/206918
PCT Pub. Date: Oct. 6, 2022

(65) Prior Publication Data
US 2025/0081148 A1 Mar. 6, 2025

(30) Foreign Application Priority Data
Apr. 2, 2021 (CN) .......................... 202110360430.4

(51) Int. Cl.
*H04W 64/00* (2009.01)
*H04L 5/00* (2006.01)

(52) U.S. Cl.
CPC ........... *H04W 64/00* (2013.01); *H04L 5/0048* (2013.01); *H04L 5/0094* (2013.01)

(58) Field of Classification Search
CPC .... H04W 64/00; H04L 5/0048; H04L 5/0094; H04L 5/00
See application file for complete search history.

(56) References Cited

U.S. PATENT DOCUMENTS

2019/0037338 A1* 1/2019 Edge ........................ H04W 4/02
2020/0154240 A1* 5/2020 Edge ..................... H04W 4/029
(Continued)

FOREIGN PATENT DOCUMENTS

CN 112438064 A 3/2021
WO 2020193853 A1 10/2020

OTHER PUBLICATIONS

Qualcomm Incorporated,"On-Demand PRS", 3GPP TSG-RAN WG2 Meeting #113-e, Electronic, Jan. 25-Feb. 5, 2021, total 9 pages, R2-2101471.
(Continued)

*Primary Examiner* — Kenneth T Lam
(74) *Attorney, Agent, or Firm* — KILPATRICK TOWNSEND & STOCKTON LLP

(57) ABSTRACT

Disclosed are a PRS resource determination method and apparatus, which are used for realizing flexible and dynamic configuration of a DL-PRS according to UE requirements, improving the network efficiency, and ensuring the positioning precision. The method for determining a PRS resource includes: obtaining a list of available PRS configuration information pre-configured by a LMF; and transmitting a PRS resource configuration request to the LMF based on the list of available PRS configuration information pre-configured by the LMF.

15 Claims, 4 Drawing Sheets

S101

Obtain a list of available PRS configuration information pre-configured by an LMF

S102

Transmit a PRS resource configuration request to the LMF based on the list of available PRS configuration information pre-configured by the LMF

(56)  References Cited

U.S. PATENT DOCUMENTS

| | | | | |
|---|---|---|---|---|
| 2020/0367193 A1* | 11/2020 | Cha | ....................... | G01S 5/0236 |
| 2021/0067382 A1* | 3/2021 | Manolakos | ........... | H04L 5/0094 |
| 2022/0039056 A1* | 2/2022 | Manolakos | ........... | H04W 24/10 |
| 2022/0070808 A1* | 3/2022 | Jacobsen | ........... | H04W 56/0035 |
| 2022/0124664 A1* | 4/2022 | Cha | ....................... | H04W 64/00 |
| 2022/0140969 A1* | 5/2022 | Cha | ....................... | G01S 5/011 |
| | | | | 455/452.1 |
| 2022/0174620 A1* | 6/2022 | Cha | .................... | H04W 56/006 |
| 2023/0076043 A1* | 3/2023 | Manolakos | ........... | H04W 64/00 |
| 2023/0204705 A1* | 6/2023 | Thomas | ............... | H04L 5/0048 |
| | | | | 342/450 |
| 2023/0224848 A1* | 7/2023 | Dong | ................... | H04W 64/00 |
| | | | | 455/456.1 |
| 2024/0040542 A1* | 2/2024 | Barbu | ................... | H04W 76/40 |
| 2024/0259150 A1* | 8/2024 | Cha | ....................... | H04L 5/0051 |

OTHER PUBLICATIONS

Lenovo et al., "On-Demand DL-PRS Support", 3GPP TSG RAN WG2 Meeting #113-bis-e, Online, Apr. 12-20, 2021, total 5 pages, R2-2103384.

InterDigital Inc., "Procedures for On-demand PRS", 3GPP RAN WG2 Meeting #113-bis-e, Electronic, Apr. 12-Apr. 20, 2021, total 5 pages, R2-2103787.

InterDigital Inc., "Discussion on Enhancements for Latency Reduction", 3GPP RAN WG2 Meeting #113-e, Electronic, Jan. 25-Feb. 5, 2021, total 5 pages, R2-2100373.

* cited by examiner

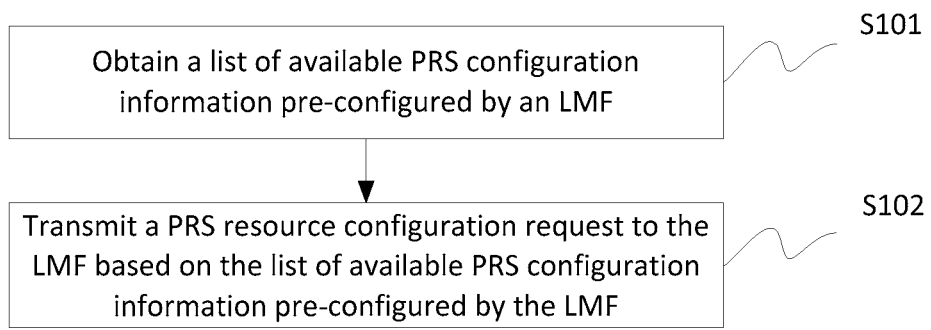

Obtain a list of available PRS configuration information pre-configured by an LMF    S101

Transmit a PRS resource configuration request to the LMF based on the list of available PRS configuration information pre-configured by the LMF    S102

FIG. 4

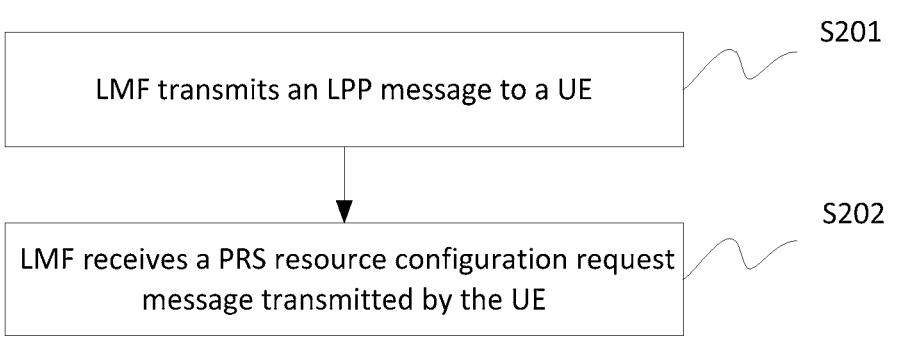

LMF transmits an LPP message to a UE    S201

LMF receives a PRS resource configuration request message transmitted by the UE    S202

FIG. 5

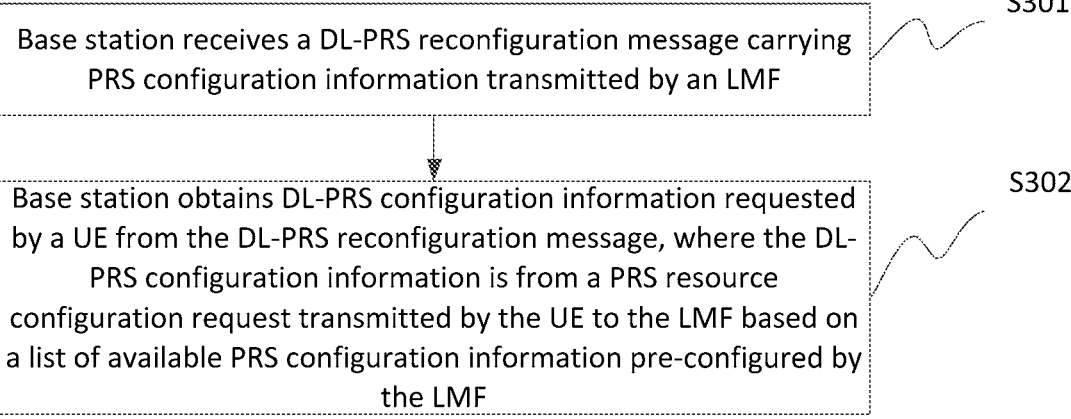

Base station receives a DL-PRS reconfiguration message carrying PRS configuration information transmitted by an LMF    S301

Base station obtains DL-PRS configuration information requested by a UE from the DL-PRS reconfiguration message, where the DL-PRS configuration information is from a PRS resource configuration request transmitted by the UE to the LMF based on a list of available PRS configuration information pre-configured by the LMF    S302

FIG. 6

PRS RESOURCE DETERMINATION METHOD AND APPARATUS

CROSS-REFERENCE TO RELATED APPLICATIONS

The application is a National Stage of International Application No. PCT/CN2022/084550, filed Mar. 31, 2022, which claims priority to Chinese patent application No. 202110360430.4, filed with China National Intellectual Property Administration on Apr. 2, 2021, and entitled "Method and Device for Determining PRS Resource", the entire contents of which are incorporated herein by reference.

FIELD

The present disclosure relates to the field of communication technologies, and in particular to a method and device for determining a PRS resource.

BACKGROUND

The positioning technology related to downlink radio access technology (RAT) performs a measurement mainly based on a downlink positioning reference signal (DL-PRS), and calculates to obtain the corresponding location information based on the result of the measurement.

The configuration process of DL-PRS is described as follows:

(1) after a location management function (LMF) obtains a DL-PRS resource(s) pre-configured by a base station from the base station, the LMF configures the corresponding DL-PRS resource(s) for a user equipment (UE) based on the DL-PRS configuration information.

Each transmission reception point (TRP) in the base station is configured with a corresponding DL-PRS resource(s). When a positioning service arrives, the LMF acquires the DL-PRS configuration information pre-configured by the base station from the base station. After the LMF obtains the DL-PRS configuration information of the base station, the LMF selects part of DL-PRS resources from the DL-PRS configuration information, and issues part of the DL-PRS resources to the UE through an assistance data (ProvideAssistanceData) message by using part of the DL-PRS resources as part of the positioning assistance data, which is as shown in FIG. 1. Or, after the LMF receives a request assistance data (RequestAssistanceData) message from the UE, the LMF selects part of DL-PRS resources from the DL-PRS configuration information, and issues part of the DL-PRS resources to the UE through a Provide AssistanceData message by using part of the DL-PRS resources as part of the positioning assistance data, which is as shown in FIG. 2.

A. The LMF proactively provides positioning assistance data information to the UE.

Step 1: The LMF proactively transmits the ProvideAssistanceData message carrying the DL-PRS configuration information to the UE.

B. The UE requests to obtain positioning assistance data information from the LMF.

Step 1: the UE transmits a RequestAssistanceData message to the LMF.

Step 2: after receiving the message, the LMF transmits a ProvideAssistanceData message, which carries the DL-PRS configuration information, to the UE as a response.

(2) The LMF acquires the DL-PRS resource(s) pre-configured by the base station.

In R16, the base station configures the corresponding DL-PRS resource(s). When the LMF needs to obtain the DL-PRS resource(s) configured by the base station, the LMF transmits a TRP information request (Information Request) message to request to obtain the DL-PRS resource(s) configured by the TRP(s) under the base station, as shown in FIG. 3.

Step 1: the LMF transmits a TRP Information request message to the base station (NG-RAN node) to request to obtain the DL-PRS resource(s) configured by the TRP(s) under the base station.

Step 2: the base station transmits a TRP information response (information Response) message to the LMF, and the response message carries the configuration information of the PRS resources configured by different TRPs under the base station.

The positioning technology related to downlink RAT performs a measurement mainly based on the DL-PRS, and calculates to obtain the corresponding location information based on the result of the measurement. However, in R16, even if there is no positioning service or there is DL-PRS that is not used by the UE, each TRP in the base station still transmits all DL-PRS signals pre-configured by itself, and in this case, waste of positioning reference signal (PRS) resources is caused. In addition, the TRP in the base station configures based on each cell when configuring the PRS, without referring to the requirement of each UE, which may lead to insufficient positioning accuracy of the UE and result in positioning failure.

SUMMARY

The embodiments of the present disclosure provide a method and a device for determining PRS configuration information, to realize flexibly and dynamically configure the DL-PRS according to the UE requirement, improve the network efficiency, and ensure the positioning accuracy.

On a side of a UE, a method for determining a PRS resource provided by an embodiment of the present disclosure includes:

obtaining a list of available PRS configuration information pre-configured by an LMF; and transmitting a PRS resource configuration request to the LMF based on the list of available PRS configuration information pre-configured by the LMF.

In the method in the embodiment of the present disclosure, the UE obtains a list of available PRS configuration information pre-configured by the LMF; and transmits a PRS resource configuration request to the LMF based on the list of available PRS configuration information pre-configured by the LMF, to realize flexibly and dynamically request to configure the DL-PRS according to the UE requirement, improve the network efficiency, and ensure the positioning accuracy.

In some embodiments, the PRS resource configuration request transmitted to the LMF includes at least one of following items:

PRS configuration information selected by a UE based on the list of available PRS configuration information pre-configured by the LMF;

configuration information of a PRS resource requested for change, determined by a UE based on the list of available PRS configuration information pre-configured and a PRS resource obtained from the LMF; or configuration information related to a beam direction of a DL-PRS.

In some embodiments, the PRS configuration information selected by the UE includes at least one of following:

a bandwidth part (BWP) identity document (ID) corresponding to a DL-PRS resource;

a positioning frequency layer ID corresponding to a DL-PRS resource;

a base station ID corresponding to a DL-PRS resource;

a TRP ID corresponding to a DL-PRS resource;

a DL-PRS resource list ID;

a DL-PRS resource ID;

a period of a DL-PRS resource;

a quantity of repetitions used by a period of a DL-PRS resource;

a muting pattern of a DL-PRS resource;

a transmission time point of a DL-PRS resource; or a time duration of a DL-PRS resource.

In some embodiments, the configuration information of the PRS resource requested for change includes at least one of following:

a BWP ID corresponding to a DL-PRS resource requested to be added or subtracted;

a positioning frequency layer ID corresponding to a DL-PRS resource requested to be added or subtracted;

a base station ID corresponding to a DL-PRS resource requested to be added or subtracted;

a TRP ID corresponding to a DL-PRS resource requested to be added or subtracted;

a DL-PRS resource list ID requested to be added or subtracted;

a DL-PRS resource ID requested to be added or subtracted;

a period of a DL-PRS resource requested to be added or subtracted;

a quantity of repetitions used by a period of a DL-PRS resource requested to be added or subtracted;

a muting pattern of a DL-PRS resource requested to be changed;

a transmission time point of a DL-PRS resource requested to be added or subtracted; or a time duration of a DL-PRS resource requested to be added or subtracted.

In some embodiments, the configuration information related to the beam direction of a DL-PRS resource includes at least one of following:

a base station ID corresponding to a DL-PRS resource;

a TRP ID corresponding to a DL-PRS resource;

a resource list ID corresponding to a DL-PRS resource; or a synchronization signal and physical broadcast channel block index (SSB_index) corresponding to a best beam receiving direction.

In some embodiments, after transmitting the PRS resource configuration request to the LMF, the method further includes performing at least one of following operations:

updating a quantity of times of initiating the PRS resource configuration request to the LMF; or turning on a timer according to configuration information of the timer transmitted by the LMF, where the timer includes a first timer and/or a second timer.

In some embodiments, in a condition that the first timer is not turn on, and/or, in a condition that the first timer is turn on, and a PRS resource configuration request response message returned by the LMF is received before the first timer expires, the method further includes:

in a condition that DL-PRS configuration information configured to indicate a user equipment requests in the PRS resource configuration request response message is accepted, performing one of following operations:

turning off the first timer;

turning off the second timer; or updating DL-PRS configuration of the UE based on the DL-PRS configuration information requested, and performing a measurement on a DL-PRS resource of the updated DL-PRS configuration;

in a condition that DL-PRS configuration information configured to indicate a user equipment request changes in the PRS resource configuration request response message is not accepted, performing at least one of following operations:

waiting for the second timer expires, and re-initiating the PRS resource configuration request after the second timer expires;

turning off the first timer;

re-initiating the PRS resource configuration request;

turning off the second timer, and initiating an assistance information request process to the LMF; or initiating an assistance information request process to the LMF.

In some embodiments, in a condition that the first timer is turn on, and a PRS resource configuration request response message returned by the LMF is not received before the first timer expires, performing at least one of following operations:

waiting for the second timer expires, and re-initiating the PRS resource configuration request after the second timer expires;

re-initiating the PRS resource configuration request;

turning off the second timer, and initiating an assistance information request process to the LMF; or initiating an assistance information request process to the LMF.

On a side of an LMF, a method for determining a PRS resource provided by an embodiment of the present disclosure includes:

transmitting, by a location management function (LMF), an LPP message to a UE; and receiving, by the LMF, a PRS resource configuration request message transmitted by the UE.

In some embodiments, the LPP message includes at least one of following:

a pre-configured list of available PRS configuration information;

a maximum quantity of times of a PRS request initiating a PRS change on a side of the UE; or configuration information of a timer related to a PRS change initiated by a side of the UE.

In some embodiments, the pre-configured list of available PRS configuration information is configured for the UE to initiate a dynamic PRS request, and includes at least one of following:

a BWP ID corresponding to an available DL-PRS resource;

a positioning frequency layer ID corresponding to an available DL-PRS resources;

a base station ID corresponding to an available DL-PRS resource;

a TRP ID corresponding to an available DL-PRS resource;

an available DL-PRS resource list ID;

an available DL-PRS resource ID;

a list of periods of available DL-PRS resources;

a list of a quantity of repetitions of available DL-PRS resources; or a list of muting patterns of available DL-PRS resources.

In some embodiments, the configuration information of the timer related to the PRS change initiated by the side of the UE includes at least one of following:

configuration information of a first timer, where the first timer is a response timer after the UE transmits the PRS resource configuration request message; or configuration information of a second timer, where the second timer is an interval timer between two consecutive PRS resource configuration request messages transmitted by the UE.

In some embodiments, the PRS resource configuration request message received by the LMF from the UE includes DL-PRS configuration information selected by the UE, and the LMF performs any one of the following:

returning a PRS resource configuration request response message to the UE, in a condition that the DL-PRS configuration information requested by the UE is in a list of DL-PRS configuration information pre-configured by a base station and obtained by the LMF from the base station, where the PRS resource configuration request response message carries an indication that the DL-PRS configuration information requested by the UE has been configured; or transmitting a DL-PRS reconfiguration message to the base station, in a condition that the DL-PRS configuration information requested by the UE is not in the list of DL-PRS configuration information pre-configured by the base station and obtained by the LMF from the base station, where the DL-PRS reconfiguration message carries the DL-PRS configuration information requested by the UE.

In some embodiments, the PRS resource configuration request message received by the LMF from the UE includes DL-PRS configuration information requested by the UE to be changed, and the DL-PRS configuration information requested to be changed includes at least one or more of following:

a BWP ID corresponding to a DL-PRS resource requested to be added;

a positioning frequency layer ID corresponding to a DL-PRS resource requested to be added;

a base station ID corresponding to a DL-PRS resource requested to be added;

a TRP ID corresponding to a DL-PRS resource requested to be added;

a DL-PRS resource list ID requested to be added;

a DL-PRS resource ID requested to be added;

a period of a DL-PRS resource requested to be added;

a quantity of repetitions of a DL-PRS resource requested to be added;

a transmission time point of a DL-PRS resource requested to be added; or a time duration of a DL-PRS resource requested to be added;

where the method further includes, performing, by the LMF, at least one of following:

returning a PRS resource configuration request response message is to the UE, in a condition that the DL-PRS configuration information requested by the UE to be changed is in a list of DL-PRS configuration information pre-configured by a base station and obtained by the LMF from the base station, where the PRS resource configuration request response message carries an indication that the DL-PRS configuration information requested by the UE to be changed has been configured; or transmitting a DL-PRS reconfiguration message to the base station, in a condition that the DL-PRS configuration information requested by the UE to be changed is not in the list of DL-PRS configuration information pre-configured by the base station and obtained by the LMF from the base station, where the DL-PRS reconfiguration message carries the DL-PRS configuration information requested by the UE to be changed.

In some embodiments, the PRS resource configuration request message received by the LMF from the UE includes DL-PRS configuration information requested by the UE to be changed, and the DL-PRS configuration information requested to be changed includes at least one of following:

a BWP ID corresponding to a DL-PRS resource requested to be subtracted;

a positioning frequency layer ID corresponding to a DL-PRS resource requested to be subtracted;

a base station ID corresponding to a DL-PRS resource requested to be subtracted;

a TRP ID corresponding to a DL-PRS resource requested to be subtracted;

a DL-PRS resource list ID requested to be subtracted;

a DL-PRS resource ID requested to be subtracted;

a period of a DL-PRS resource requested to be subtracted;

a quantity of repetitions of a DL-PRS resource requested to be subtracted;

a transmission time point of a DL-PRS resource requested to be subtracted; or a time duration of a DL-PRS resource requested to be subtracted;

where the method further includes, performing, by the LMF, at least one of following:

returning a PRS resource configuration request response message to the UE, in a condition that a DL-PRS resource requested by the UE to be changed is currently used by other positioning UE, where the PRS resource configuration request response message carries an indication that the DL-PRS configuration information requested by the UE to be changed is not accepted; or transmitting a DL-PRS reconfiguration message to the base station, in a condition that the DL-PRS resource requested by the UE to be changed is not currently used by other positioning UE, where the DL-PRS reconfiguration message carries the DL-PRS configuration information requested by the UE to be changed.

In some embodiments, the PRS resource configuration request message received by the LMF from the UE includes configuration information related to a beam direction of a DL-PRS, and the LMF performs at least one of following:

transmitting a PRS resource configuration request response message to the UE, in a condition that a DL-PRS resource of which a beam direction is requested by the UE to be changed is currently used by other positioning UEs, where the PRS resource configuration request response message carries an indication that configuration information related to a beam direction of a DL-PRS resource of the user equipment is not accepted; or transmitting a DL-PRS reconfiguration message to the base station, in a condition that the DL-PRS resource of which a beam direction is requested by the UE to be changed is not currently used by other positioning UEs, where the DL-PRS reconfiguration message carries configuration information related to a beam direction of a DL-PRS resource requested by the UE.

In some embodiments, the method further includes:

receiving, by the LMF, a reconfiguration response message fed back by the base station, where the reconfiguration response message is a response of the base station to the DL-PRS reconfiguration message, and then performing, by the LMF at least one of following;

transmitting a PRS resource configuration request response message to the UE, in a condition that the reconfiguration response message fed back by the base station indicates that a request is accepted, where the PRS resource configuration request response message carries an indication that a DL-PRS resource requested by the UE has been accepted, and/or reconfigured configuration information of a DL-PRS resource;

transmitting a PRS resource configuration request response message to the UE, in a condition that the reconfiguration response message fed back by the base station indicates that a request is rejected, where the PRS resource configuration request response message carries an indication that a DL-PRS resource requested by the UE is not accepted.

On a side of a base station, a method for determining a PRS resource provided by an embodiment of the present disclosure includes:

receiving, by a base station, a DL-PRS reconfiguration message carrying PRS configuration information transmitted by an LMF; and obtaining, by the base station, DL-PRS configuration information requested by a UE from the DL-PRS reconfiguration message, where the DL-PRS configuration information is from a PRS resource configuration request transmitted by the UE to the LMF based on a list of PRS configuration information pre-configured by the LMF.

In some embodiments, after the receiving, by the base station the DL-PRS reconfiguration message transmitted by the LMF, the base station performs at least one of following:

returning a reconfiguration response message to the LMF, in a condition that a PRS resource can be reconfigured by the base station based on the DL-PRS reconfiguration message, where the reconfiguration response message carries an indication that a PRS configuration is completed by the base station; or returning a reconfiguration response message to the LMF, in a condition that a PRS resource configuration cannot be performed by the base station according to the DL-PRS reconfiguration message, where the reconfiguration response message carries an indication indicating that the base station is not capable of configuring a requested PRS resource.

On a side of a UE, a device for determining a PRS resource provided by an embodiment of the present disclosure includes:

a memory, configured for storing program instructions; and a processor, configured for calling the program instructions stored in the memory, and according to an obtained program:

obtaining a list of available PRS configuration information pre-configured by an LMF; and transmitting a PRS resource configuration request to the LMF based on the list of available PRS configuration information pre-configured by the LMF.

In some embodiments, the PRS resource configuration request transmitted to the LMF includes at least one of following items:

PRS configuration information selected based on the list of available PRS configuration information pre-configured by the LMF;

configuration information of a PRS resource requested for change, determined based on the list of available PRS configuration information pre-configured and a PRS resource obtained from the LMF; or configuration information related to a beam direction of the DL-PRS.

In some embodiments, the PRS configuration information selected includes at least one f following:

a BWP ID corresponding to a DL-PRS resource;

a positioning frequency layer ID corresponding to a DL-PRS resource;

a base station ID corresponding to a DL-PRS resource;

a TRP ID corresponding to a DL-PRS resource;

a DL-PRS resource list ID;

a DL-PRS resource ID;

a period of a DL-PRS resource;

a quantity of repetitions used by a period of a DL-PRS resource;

a muting pattern of a DL-PRS resource;

a transmission time point of a DL-PRS resource; or a time duration of a DL-PRS resource.

In some embodiments, the configuration information of the PRS resource requested to be changed includes at least one of following:

a BWP ID corresponding to a DL-PRS resource requested to be added or subtracted;

a positioning frequency layer ID corresponding to a DL-PRS resource requested to be added or subtracted;

a base station ID corresponding to a DL-PRS resource requested to be added or subtracted;

a TRP ID corresponding to a DL-PRS resource requested to be added or subtracted;

a DL-PRS resource list ID requested to be added or subtracted;

a DL-PRS resource ID requested to be added or subtracted;

a period of a DL-PRS resource requested to be added or subtracted;

a quantity of repetitions used by a period of a DL-PRS resource requested to be added or subtracted;

a muting pattern of a DL-PRS resource requested to be changed;

a transmission time point of a DL-PRS resource requested to be added or subtracted; or a time duration of a DL-PRS resource requested to be added or subtracted.

In some embodiments, the configuration information related to the beam direction of a DL-PRS resource includes at least one of following items:

a base station ID corresponding to a DL-PRS resource;

a TRP ID corresponding to a DL-PRS resource;

a resource list ID corresponding to a DL-PRS resource; or an SSB_index corresponding to a best beam receiving direction.

In some embodiments, after transmitting the PRS resource configuration request to the LMF, the method further includes performing at least one of following operations:

updating a quantity of times of initiating the PRS resource configuration request to the LMF; or turning on a timer according to configuration information of the timer transmitted by the LMF, where the timer includes a first timer and/or a second timer.

In some embodiments, in a condition that the first timer is not turn on, and/or, in a condition that the first timer is turn on, and a PRS resource configuration request response message returned by the LMF is received before the first timer expires, the method further includes:

in a condition that DL-PRS configuration information configured to indicate a user equipment requests in the PRS resource configuration request response message is accepted, performing one of following operations:

turning off the first timer;

turning off the second timer; or updating DL-PRS configuration of the UE based on the DL-PRS configuration information requested, and performing a measurement on a DL-PRS resource of the updated DL-PRS configuration;

in a condition that DL-PRS configuration information configured to indicate a user equipment request changes in the PRS resource configuration request response message is not accepted, performing one of following operations:

waiting for the second timer expires, and re-initiating the PRS resource configuration request after the second timer expires;

turning off the first timer;

re-initiating the PRS resource configuration request;

turning off the second timer, and initiating an assistance information request process to the LMF; or initiating an assistance information request process to the LMF.

In some embodiments, in a condition that the first timer is turn on, and a PRS resource configuration request response message returned by the LMF is not received before the first timer expires, performing at least one of following operations:

waiting for the second timer expires, and re-initiating the PRS resource configuration request after the second timer expires;

re-initiating the PRS resource configuration request;

turning off the second timer, and initiating an assistance information request process to the LMF; or initiating an assistance information request process to the LMF.

On a side of an LMF, a device for determining a PRS resource provided by an embodiment of the present disclosure includes:

a memory, configured for storing program instructions; and a processor, configured for calling the program instructions stored in the memory, and according to an obtained program:

transmitting an LPP message to a UE; and receiving a PRS resource configuration request message transmitted by the UE.

In some embodiments, the LPP message includes at least one of following:

a pre-configured list of available PRS configuration information;

a maximum quantity of times of a PRS request initiating a PRS change on a side of the UE; or configuration information of a timer related to a PRS change initiated by a side of the UE.

In some embodiments, the pre-configured list of available PRS configuration information is configured for the UE to initiate a dynamic PRS request, and includes at least one of following:

a BWP ID corresponding to an available DL-PRS resource;

a positioning frequency layer ID corresponding to an available DL-PRS resources;

a base station ID corresponding to an available DL-PRS resource;

a TRP ID corresponding to an available DL-PRS resource;

an available DL-PRS resource list ID;

an available DL-PRS resource ID;

a list of periods of available DL-PRS resources;

a list of a quantity of repetitions of available DL-PRS resources; or a list of muting patterns of available DL-PRS resources.

In some embodiments, the configuration information of the timer related to the PRS change initiated by the side of the UE includes at least one of following:

configuration information of a first timer, where the first timer is a response timer after the UE transmits the PRS resource configuration request message; or configuration information of a second timer, where the second timer is an interval timer between two consecutive PRS resource configuration request messages transmitted by the UE.

In some embodiments, the PRS resource configuration request message received by the LMF from the UE includes DL-PRS configuration information selected by the UE, and the LMF performs any one of following items;

returning a PRS resource configuration request response message to the UE, in a condition that the DL-PRS configuration information requested by the UE is in a list of DL-PRS configuration information pre-configured by a base station and obtained by the LMF from the base station, where the PRS resource configuration request response message carries an indication that the DL-PRS configuration information requested by the UE has been configured; or transmitting a DL-PRS reconfiguration message to the base station, in a condition that the DL-PRS configuration information requested by the UE is not in the list of DL-PRS configuration information pre-configured by the base station and obtained by the LMF from the base station, where the DL-PRS reconfiguration message carries the DL-PRS configuration information requested by the UE.

In some embodiments, the PRS resource configuration request message received by the LMF from the UE includes DL-PRS configuration information requested by the UE to be changed, where the DL-PRS configuration information requested to be changed includes at least one of following:

a BWP ID corresponding to a DL-PRS resource requested to be added;

a positioning frequency layer ID corresponding to a DL-PRS resource requested to be added;

a base station ID corresponding to a DL-PRS resource requested to be added;

a TRP ID corresponding to a DL-PRS resource requested to be added;

a DL-PRS resource list ID requested to be added;

a DL-PRS resource ID requested to be added;

a period of a DL-PRS resource requested to be added;

a quantity of repetitions of a DL-PRS resource requested to be added;

a transmission time point of a DL-PRS resource requested to be added; or a time duration of a DL-PRS resource requested to be added;

where the device further includes, performing, by the LMF, at least one of following items:

returning a PRS resource configuration request response message is to the UE, in a condition that the DL-PRS configuration information requested by the UE to be changed is in a list of DL-PRS configuration information pre-configured by a base station and obtained by the LMF from the base station, where the PRS resource configuration request response message carries an indication that the DL-PRS configuration information requested by the UE to be changed has been configured; or transmitting a DL-PRS reconfiguration message to the base station, in a condition that the DL-PRS configuration information requested by the UE to be changed is not in the list of DL-PRS configuration information pre-configured by the base station and obtained by the LMF from the base station, where the DL-PRS reconfiguration message carries the DL-PRS configuration information requested by the UE to be changed.

In some embodiments, the PRS resource configuration request message received by the LMF from the UE includes DL-PRS configuration information requested by the UE to be changed, and the DL-PRS configuration information requested to be changed includes at least one of following:

a BWP ID corresponding to a DL-PRS resource requested to be subtracted;

a positioning frequency layer ID corresponding to a DL-PRS resource requested to be subtracted;

a base station ID corresponding to a DL-PRS resource requested to be subtracted;

a TRP ID corresponding to a DL-PRS resource requested to be subtracted;

a DL-PRS resource list ID requested to be subtracted;

a DL-PRS resource ID requested to be subtracted;

a period of a DL-PRS resource requested to be subtracted;

a quantity of repetitions of a DL-PRS resource requested to be subtracted;

a transmission time point of a DL-PRS resource requested to be subtracted; or a time duration of a DL-PRS resource requested to be subtracted;

where the device further includes, performing, by the LMF, at least one of following:

returning a PRS resource configuration request response message to the UE, in a condition that a DL-PRS resource requested by the UE to be changed is currently used by other positioning UE, where the PRS resource configuration request response message carries an indication that the DL-PRS configuration information requested by the UE to be changed is not accepted; or transmitting a DL-PRS reconfiguration message to the base station, in a condition that the DL-PRS resource requested by the UE to be changed is not currently used by other positioning UE, where the DL-PRS reconfiguration message carries the DL-PRS configuration information requested by the UE to be changed.

In some embodiments, the PRS resource configuration request message received by the LMF from the UE includes configuration information related to a beam direction of a DL-PRS, then the LMF performs at least one of following;

transmitting a PRS resource configuration request response message to the UE, in a condition that a DL-PRS resource of which a beam direction is requested by the UE to be changed is currently used by other positioning UEs, where the PRS resource configuration request response message carries an indication that configuration information related to a beam direction of a DL-PRS resource of the UE is not accepted;

transmitting a DL-PRS reconfiguration message to the base station, in a condition that the DL-PRS resource of which a beam direction is requested by the UE to be changed is not currently used by other positioning UEs, where the DL-PRS reconfiguration message carries configuration information related to a beam direction of a DL-PRS resource requested by the UE.

In some embodiments, the processor is further configured for receiving a reconfiguration response message fed back by the base station, where the reconfiguration response message is a response of the base station to the DL-PRS reconfiguration message, and then performing at least one of following:

transmitting a PRS resource configuration request response message to the UE, in a condition that the reconfiguration response message fed back by the base station indicates that a request is accepted, where the PRS resource configuration request response message carries an indication that a DL-PRS resource requested by the UE has been accepted, and/or reconfigured configuration information of a DL-PRS resource;

transmitting a PRS resource configuration request response message to the UE, in a condition that the reconfiguration response message fed back by the base station indicates that a request is rejected, where the PRS resource configuration request response message carries an indication that a DL-PRS resource requested by the UE is not accepted.

On a side of a base station, a device for determining a PRS resource provided by an embodiment of the present disclosure includes:

a memory, configured for storing program instructions; and a processor, configured for calling the program instructions stored in the memory, and according to an obtained program:

receiving a DL-PRS reconfiguration message carrying PRS configuration information transmitted by an LMF; and obtaining DL-PRS configuration information requested by a UE from the DL-PRS reconfiguration message, where the DL-PRS configuration information is from a PRS resource configuration request transmitted by the UE to the LMF based on a list of PRS configuration information pre-configured by the LMF.

In some embodiments, after receiving the DL-PRS reconfiguration message transmitted by the LMF, the processor is further configured for performing at least one of following:

returning a reconfiguration response message to the LMF, in a condition that a PRS resource may be reconfigured based on the DL-PRS reconfiguration message, where the reconfiguration response message carries an indication that a PRS configuration is completed by the base station;

returning a reconfiguration response message to the LMF, in a condition that a PRS resource configuration cannot be performed according to the DL-PRS reconfiguration message, where the reconfiguration response message carries an indication indicating that the base station is not capable of configuring a requested PRS resource.

On a side of a UE, another device for determining a PRS resource provided by the embodiment of the present disclosure includes:

an obtaining device, configured to obtain a list of available PRS configuration information pre-configured by an LMF; and a requesting device, configured to transmit a PRS resource configuration request to the LMF based on the list of available PRS configuration information pre-configured by the LMF.

On a side of an LMF, another device for determining a PRS resource provided by the embodiment of the present disclosure includes:

a transmitting device, configured to transmit an LPP message to a UE; and a receiving device, configured to receive a PRS resource configuration request message transmitted by the UE.

On a side of a base station, another device for determining a PRS resource provided by the embodiments of the present disclosure includes:

a receiving device, configured to receive a DL-PRS reconfiguration message carrying PRS configuration information transmitted by an LMF; and an obtaining device, configured to obtain DL-PRS configuration information requested by a UE from the PRS reconfiguration message, where the DL-PRS configuration information is from a PRS resource configuration request transmitted by the UE to the LMF based on a list of PRS configuration information pre-configured by the LMF.

Another embodiment of the present disclosure provides a computing device, including a memory and a processor, where the memory is used for storing program instructions, and the processor is configured for calling the program instructions stored in the memory, and performing any of the above methods according to an obtained program.

Another embodiment of the present disclosure provides a computer storage medium, where the computer storage medium stores computer executable instructions, where the computer executable instructions are used to cause the computer to perform any one of the above methods.

BRIEF DESCRIPTION OF FIGURES

In order to illustrate the embodiments of the present disclosure more clearly, the following briefly introduces the accompanying drawings used in the description of embodiments. The drawings in the following description are only some embodiments of the present disclosure.

FIG. 4 is a schematic flowchart of a method for determining PRS configuration information on a side of a UE provided by an embodiment of the present disclosure.

FIG. 5 is a schematic flowchart of a method for determining PRS configuration information on a side of an LMF provided by an embodiment of the present disclosure.

FIG. 6 is a schematic flowchart of a method for determining PRS configuration information on a side of a base station according to an embodiment of the present disclosure.

DETAILED DESCRIPTION

Figure 1:
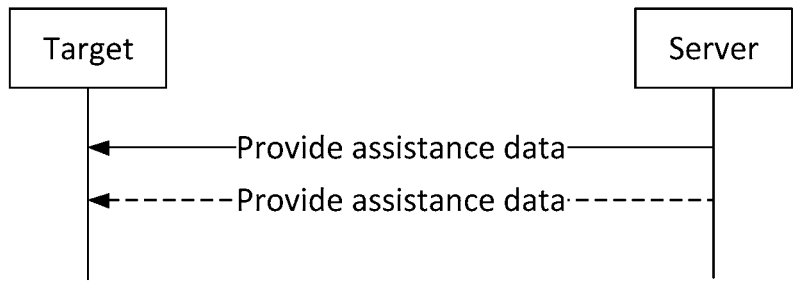
FIG. 1 is a schematic diagram of a transmission of a ProvideAssistanceData message in the prior art.
Figure 2:
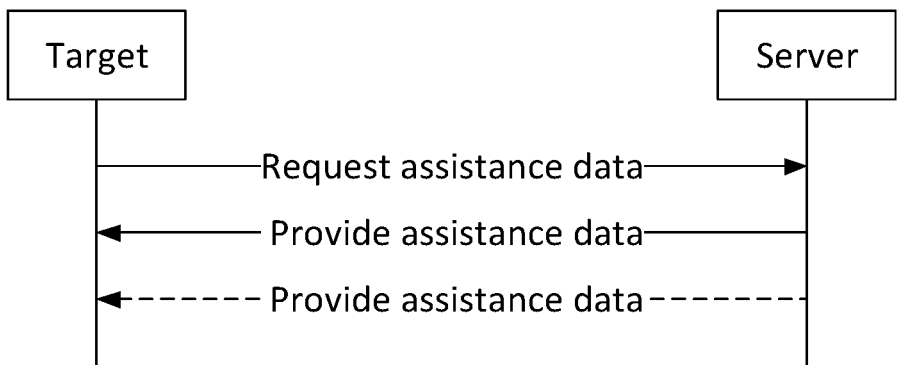
FIG. 2 is a schematic diagram of a transmission of a RequestAssistanceData and a ProvideAssistanceData message in the prior art.
Figure 3:
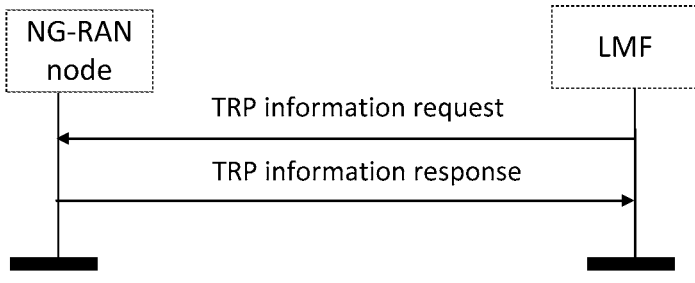
FIG. 3 is a schematic diagram of a transmission of TRP information in the prior art.

The embodiments of the present disclosure will be clearly and completely described below with reference to the drawings in embodiments of the present disclosure. The described embodiments are only a part of embodiments of the present disclosure, not all of embodiments.

Embodiments of the present disclosure provide a method and a device for determining PRS configuration information, to flexibly and dynamically configure the DL-PRS according to UE requirements, improve the network efficiency, and ensure the positioning accuracy.

The method and the device are based on the same disclosure concept, and since the principles of the method and the device for solving the problem are similar, implementations of the device and the method can be referred to each other, and repeated descriptions will not be repeated here.

The embodiments of the present disclosure may be applied to various systems, especially 5G systems. For example, applicable systems may be a global system of mobile communication (GSM) system, a code division multiple access (CDMA) system, a wideband code division multiple access (WCDMA), a general packet radio service (GPRS) system, a long term evolution (LTE) system, an LTE frequency division duplex (FDD) system, an LTE time division duplex (TDD), a universal mobile telecommunication system (UMTS), a worldwide interoperability for microwave access (WiMAX) system, a 5G system and 5G New Radio (NR) system, etc. The various systems include a terminal device and a network device.

The terminal device involved in embodiments of the present disclosure may be a device that provides voice and/or data connectivity to a user, a handheld device with a wireless connection function, or other processing device connected to a wireless modem. In different systems, the name of the terminal device may be different. For example, in the 5G system, the terminal device may be called a user equipment. The wireless terminal device may communicate with one or more core networks via the RAN, and the wireless terminal device may be a mobile terminal device such as a mobile phone (or called "cellular" phone) and a computer with a mobile terminal device, for example, which may be portable, pocket, handheld, computer built-in or vehicle mounted mobile devices that exchange language and/or data with the radio access network. For example, a personal communication service (PCS) phone, a cordless phone, a session initiated protocol (SIP) phone, a wireless local loop (WLL) station, a personal digital assistant (PDA) and other devices. The wireless terminal device may also be referred to as a system, a subscriber unit, a subscriber station, a mobile station, a mobile, a remote station, an access point, a remote terminal, an access terminal, a user terminal, a user agent, and a user device, which are not limited in the embodiments of the present disclosure.

The network device involved in embodiments of the present disclosure may be a base station which may include multiple cells. Depending on the specific application scenarios which are different, the base station may also be called an access point, or may refer to a device in the access network that communicates with the wireless terminal device through one or more sectors on the air interface, or other names. The network device may be configured to convert the received air frame to and from the internet protocol (IP) packet and may act as a router between the wireless terminal device and the rest of the access network, and the rest of the access network may include the IP communication network. The network device may also coordinate the attribute management for the air interface. For example, the network device involved in the embodiments of the present disclosure may be a global system for mobile communication (GSM) or a network device (base transceiver station, BTS) in the code division multiple access (CDMA), or a network device (NodeB) in the wideband code division multiple access (WCDMA), or an evolved network device (evolutional node B, eNB or e-NodeB) in a long term evolution (LTE) system, a 5G base station in 5G network architecture (next generation system), a home evolved node B (HeNB), a relay node, a home base station (femto), a pico base station (pico), etc., which are not limited in the embodiments of the present disclosure.

The various embodiments of the present disclosure will be described in detail below with reference to the accompanying drawings. It should be noted that the display order of the embodiments of the present disclosure only represents the sequence of the embodiments, and does not represent the advantages and disadvantages of the embodiments.

In embodiments of the present disclosure, the UE dynamically triggers a PRS configuration request based on a list of available PRS configuration information pre-configured by the LMF, and/or the maximum quantity of times of the UE triggers the PRS change configured by the LMF, and/or configuration information of a timer, related to a PRS configuration request triggered by the UE, configured by the LMF etc., to realize flexibly and dynamically configure the DL-PRS according to UE requirements, to improve network efficiency and ensuring positioning accuracy.

The list of available PRS configuration information pre-configured by the LMF, or also called a list of PRS configuration information that is pre-configured and the UE can dynamically request/change, refers to the range of PRS resources configured by the LMF for the UE that may be used by the UE to initiate the PRS configuration request, that is, when the UE initiates the PRS configuration request, the requested PRS configuration can only be a PRS configuration in the list of PRS configuration information that is pre-configured.

The following describes the embodiments of the present disclosure on different sides.

On a Side of a UE

I. The UE initiates a PRS resource configuration request based on a list of PRS configuration information (or referred to as a list of available PRS configuration information) that is carried in an LPP message 1 (e.g., a message 1) and the UE can dynamically request/change. In one embodiment, there may be the following three cases.

Case 1: in some embodiments, the UE, based on its own channel environment condition, positioning accuracy requirement, and/or measurement result, selects the PRS resource configuration information from the dynamically changeable PRS configuration information issued by the LMF, carries the selected PRS resource configuration information in the PRS resource configuration request message, and reports the PRS resource configuration request message to the LMF. The PRS resource configuration information selected by the UE includes at least one of the following:

a bandwidth part BWP ID corresponding to a DL-PRS resource;

a positioning frequency layer ID corresponding to a DL-PRS resource;

a base station ID corresponding to a DL-PRS resource;

a TRP ID corresponding to a DL-PRS resource;

a DL-PRS resource list ID;

a DL-PRS resource ID;

a period of a DL-PRS resource;

a quantity of repetitions used by a period of a DL-PRS resource;

a muting pattern of a DL-PRS resource;

a transmission time point of a DL-PRS resource; or a time duration of a DL-PRS resource.

Case 2: in some embodiments, if the UE has obtained the PRS resource configured by the LMF for the UE from the LMF before requesting the configuration information of the PRS resource, the UE may carry the configuration information of the configured PRS resource to be requested to be changed in the PRS resource configuration request message based on the PRS configuration and report the PRS resource configuration request message to the LMF. The configuration information of the PRS resource requested by the UE to be changed may include at least one of the following:

a BWP ID corresponding to a DL-PRS resource requested to be added or subtracted;

a positioning frequency layer ID corresponding to a DL-PRS resource requested to be added or subtracted;

a base station ID corresponding to a DL-PRS resource requested to be added or subtracted;

a TRP ID corresponding to a DL-PRS resource requested to be added or subtracted;

a DL-PRS resource list ID requested to be added or subtracted;

a DL-PRS resource ID requested to be added or subtracted;

a period of a DL-PRS resource requested to be added or subtracted;

a quantity of repetitions used by a period of a DL-PRS resource requested to be added or subtracted;

a muting pattern of a DL-PRS resource requested to be changed;

a transmission time point of a DL-PRS resource requested to be added or subtracted; or a time duration of a DL-PRS resource requested to be added or subtracted.

Case 3: in some embodiments, the UE may also determine the configuration information related to the beam direction of the DL-PRS resource based on the measurement result or the reception situation of the synchronization signal and the physical broadcast channel block (SSB). For example, the configuration information related to the beam direction of the DL-PRS resource includes at least one of the following:

a base station ID corresponding to a DL-PRS resource;

a TRP ID corresponding to a DL-PRS resource;

a resource list ID corresponding to a DL-PRS resource; or an SSB_index corresponding to a best beam receiving direction.

The configuration information related to the beam direction of the DL-PRS resource may be reported to the LMF through the PRS resource configuration request message.

II. In some embodiments, after the UE transmits the message carrying the PRS resource configuration request, the UE updates the quantity of times N of the PRS request on the side of the UE (that is, the quantity of times of initiating the DL-PRS configuration request); and, in one embodiment, when the LPP message 1 contains the configuration information of the timer, (for example, in response to the timing duration of the timer T1, and/or the timing duration of the request interval timer T2), the UE may also perform at least one of the following operations:

turning on the response timer T1 (also referred to as the first timer); or turning on the request interval timer T2 (referred to as the second timer).

The function of the response timer T1 is that if the UE receives a response message from the LMF before the response timer T1 expires, it can be considered that the PRS resource configuration is successful; otherwise, if the current accumulated quantity of times N of initiating the DL-PRS configuration request is not greater than the preset threshold, it is determined that it is necessary to continue to initiate the DL-PRS configuration request. The function of the request interval timer T2, that is, the time interval between two consecutive DL-PRS configuration requests, for example, the request interval timer T2 is turn on when the DL-PRS configuration request is initiated, if it is determined that it is necessary to continue to initiate the DL-PRS configuration request, the DL-PRS configuration request is initiated again when the timer T2 expires.

III. In a condition that the response timer T1 is not configured, and/or, in a condition that the response timer T1 is configured and the UE receives the PRS resource configuration request response message fed back by the LMF before the response timer T1 expires, the method further includes:

A. In a condition that DL-PRS configuration information configured to indicate a user equipment requests in the PRS resource configuration request response message is accepted, the UE performs at least one of the following:

1. UE turns off the response timer T1;

2. UE turns off the interval timer T2; or

3. The DL-PRS configuration of the UE is updated based on the requested DL-PRS configuration information, and the measurement is performed on the configured DL-PRS resources.

B. In a condition that DL-PRS configuration information configured to indicate a user equipment request changes in the PRS resource configuration request response message cannot be accepted, the UE performs at least one of the following:

1. UE turns off the response timer T1;

2. When the quantity of times N of the PRS request is less than the maximum quantity of times of the request configured by the LMF for the UE, the UE performs at least one of the following:

waiting for the interval timer T2 expires, re-initiating the PRS resource configuration request after the interval timer T2 expires; or re-initiating a new DL-PRS configuration information request process.

3. When the quantity of times N of the PRS request is equal to the maximum quantity of times of the request configured by the LMF for the UE, the UE performs at least one of the following:

turning of the interval timer T2;

performing the measurement based on the PRS in the assistance information configured by the LMF for the UE.

In some embodiments, before UE performs the measurement based on the PRS in the assistance information configured by the LMF for the UE, the UE transmits the RequestAssistanceData message that carries no PRS configuration information to the LMF and requests to obtain the PRS configured on the side of the LMF.

IV. If the response timer T1 is configured, but the UE receive no PRS resource configuration request response message fed back by the LMF before the response timer T1 expires, the UE executes:

1. When the quantity of times N of the PRS request is less than the maximum quantity of times of the request configured by the LMF for the UE, the UE performs at least one of the following:

waiting for the interval timer T2 expires, initiating the PRS resource configuration request after the interval timer T2 expires; or re-initiating a new DL-PRS configuration information request process;

2. When the quantity of times N of the PRS request is equal to the maximum quantity of times of the request configured by the LMF for the UE, the UE performs at least one of the following:

turning off the interval timer T2;

performing the measurement based on the PRS in the assistance information configured by the LMF for the UE.

In some embodiments, before UE performs the measurement based on the PRS in the assistance information configured by the LMF for the UE, the UE transmits the RequestAssistanceData message that carries no PRS configuration information to the LMF and requests to obtain the PRS configured on the side of the LMF.

On a side of an LMF

I. When a positioning service arrives, the LMF transmits an LPP message 1 to the UE, and the LPP message 1 includes:

a list of available DL-PRS configuration information;

and/or, the maximum quantity of times of the PRS request initiating the PRS change on the side of the UE;

and/or, the configuration information of the timer related to the PRS change initiated by the side of the side of the UE.

In one embodiment, the list of available DL-PRS configuration information includes at least one of the following:

a BWP ID corresponding to a DL-PRS resource;

a positioning frequency layer ID corresponding to an available DL-PRS resources;

a base station ID corresponding to an available DL-PRS resource;

a TRP ID corresponding to an available DL-PRS resource;

an available DL-PRS resource list ID;

an available DL-PRS resource ID;

a list of periods of available DL-PRS resources;

a list of a quantity of repetitions of available DL-PRS resources; or a list of muting patterns of available DL-PRS resources.

The configuration information of the timer related to the PRS change initiated by the side of the UE includes at least one of the following:

the configuration of the interval timer between two consecutive PRS resource configuration request messages transmitted by the UE; or the configuration of the response timer after the UE transmits the PRS resource configuration request message.

II. In a condition that the LMF receives the PRS resource configuration request message transmitted by the UE, the method further includes:

the LMF returns the PRS resource configuration request response message to the UE, in a condition that the DL-PRS configuration information requested by the user equipment is in a list of DL-PRS configuration information pre-configured by a base station and obtained by the LMF from the base station, where the PRS resource configuration request response message carries an indication that the DL-PRS configuration information requested by the user equipment has been configured;

the LMF transmits the DL-PRS reconfiguration message to the base station, in a condition that the DL-PRS configuration information requested by the UE is not in the list of DL-PRS configuration information pre-configured by the base station and obtained by the LMF from the base station, where the L-PRS reconfiguration message carries the DL-PRS configuration information requested by the UE.

III. In a condition that the LMF has issued the DL-PRS resource configured for the UE to the UE through the ProvideAssistanceData message, and the LMF receives the PRS resource configuration request message transmitted by the UE, the method further includes:

where the DL-PRS configuration information requested by the UE to be changed includes at least one of the following:

a BWP ID corresponding to a DL-PRS resource requested to be added;

a positioning frequency layer ID corresponding to a DL-PRS resource requested to be added;

a base station ID corresponding to a DL-PRS resource requested to be added;

a TRP ID corresponding to a DL-PRS resource requested to be added;

a DL-PRS resource list ID requested to be added;

a DL-PRS resource ID requested to be added;

a period of a DL-PRS resource requested to be added;

a quantity of repetitions of a DL-PRS resource requested to be added;

a transmission time point of a DL-PRS resource requested to be added; or a time duration of a DL-PRS resource requested to be added.

The LMF returns the PRS resource configuration request response message to the UE, in a condition that the DL-PRS configuration information requested by the UE to be changed is in the list of DL-PRS configuration information pre-configured by the base station and obtained by the LMF from the base station, where the PRS resource configuration request response message carries an indication that the DL-PRS configuration information requested by the user equipment to be changed has been configured.

The LMF transmits the DL-PRS reconfiguration message to the base station, in a condition that the DL-PRS configuration information requested by the UE to be changed is not in the list of DL-PRS configuration information pre-configured by the base station and obtained by the LMF from the base station, where the DL-PRS reconfiguration message carries the DL-PRS configuration message requested by the UE to be changed.

The DL-PRS configuration information requested by the UE to be changed includes at least one of the following:

a BWP ID corresponding to a DL-PRS resource requested to be subtracted;

a positioning frequency layer ID corresponding to a DL-PRS resource requested to be subtracted;

a base station ID corresponding to a DL-PRS resource requested to be subtracted;

a TRP ID corresponding to a DL-PRS resource requested to be subtracted;

a DL-PRS resource list ID requested to be subtracted;

a DL-PRS resource ID requested to be subtracted;

a period of a DL-PRS resource requested to be subtracted;

a quantity of repetitions of a DL-PRS resource requested to be subtracted;

a transmission time point of a DL-PRS resource requested to be subtracted; or a time duration of a DL-PRS resource requested to be subtracted.

Then, the LMF first checks whether these DL-PRS resources requested by the UE are currently used by other positioning UEs. When these DL-PRS resources have not been used by other positioning UEs, the method further includes:

the LMF transmits the DL-PRS reconfiguration message to the base station, where the DL-PRS reconfiguration message carries the DL-PRS configuration information requested by the UE to be changed.

When these DL-PRS resources have been allocated to other positioning UEs, the method further includes:

the LMF rejects the request from the UE, returns the PRS resource configuration request response message to the UE, and indicates, that the DL-PRS configuration information requested by the UE to be changed cannot be accepted, in the response message.

IV. When the LMF receives a RequestAssistanceData message or other LPP message that contains a request to change the beam direction of the DL-PRS configuration transmitted by the UE, the LMF first checks whether the DL-PRS resource, the beam direction of which is requested by the UE to change, is currently used by other positioning UEs:

in a condition that these DL-PRS resources have not been used by other positioning UEs, the LMF transmits a DL-PRS reconfiguration message to the base station, where the DL-PRS reconfiguration message carries the DL-PRS configuration of which the beam direction is requested by the UE requests to be changed;

in a condition that these DL-PRS resources have been allocated to other positioning UEs, the LMF rejects the request from the UE, returns a PRS resource configuration request response message to the UE, and indicates, in the response message, that the DL-PRS configuration of which the beam direction is requested by the UE to be changed cannot be accepted.

V. After the LMF receives the DL-PRS reconfiguration response message returned by the base station:

in a condition that the DL-PRS reconfiguration response message indicates that the base station has completed the requested DL-PRS configuration, the LMF transmits a PRS resource configuration request response message to the UE, and the PRS resource configuration request response message indicates to the UE that the DL-PRS resource requested by the UE has been accepted, and/or carries the reconfigured DL-PRS resource in the response message;

in a condition that the DL-PRS reconfiguration response message indicates that the base station cannot configure the requested DL-PRS, the LMF transmits a PRS resource configuration request response message to the UE, and indicates that the DL-PRS resource requested by the UE is not accepted.

On a Side of a Base Station

After receiving the DL-PRS reconfiguration message carrying PRS configuration information transmitted by the LMF, the base station obtains the DL-PRS configuration information requested by the UE from the DL-PRS reconfiguration message, where the DL-PRS configuration information is from a PRS resource configuration request transmitted by the UE to the LMF based on the list of PRS configuration information pre-configured by the LMF.

In some embodiments, the base station returns a PRS reconfiguration response message to the LMF, in a condition that a PRS resource is reconfigured based on the reconfiguration message, where the PRS reconfiguration response message indicates the base station to complete the configuration of the corresponding PRS.

In some embodiments, the base station returns a PRS reconfiguration response message to the LMF, in a condition that the base station cannot configure the PRS based on the PRS configuration information in the reconfiguration message, where the PRS reconfiguration response message indicates that the base station cannot configure the configuration of the corresponding PRS.

Additional explanations are as follows:

the PRS resource configuration request message is transmitted by the UE to the LMF, and the message may be an existing RequestAssistanceData message or other LPP messages;

the PRS resource configuration request response message is a response to the PRS resource configuration request message transmitted by the LMF to the UE, and the message may be an existing ProvideAssistanceData message or other LPP messages;

the DL-PRS reconfiguration message is transmitted by the LMF to the base station, and the message may be an existing positioning information request (PositioningInformationRequest) message or other NR Positioning Protocol A (NRPPa) message;

the DL-PRS reconfiguration response message is a response to the DL-PRS reconfiguration message transmitted by the base station to the LMF, and the message may be an existing positioning information response (PositioningInformationResponse) message or other NRPPa messages.

A description of several specific embodiments is given below.

Embodiment 1: the LMF pre-configures a list of available DL-PRS configuration information for the UE based on the PRS resources configured by the base station.

Step 1: the LMF transmits a TRP information request message to the base station to request to obtain the PRS resources configured by the base station.

Step 2: the base station transmits a TRP information response message to the LMF, and the response message carries the configuration information of the PRS resources configured by different TRP under the base station.

Step 3: after receiving the PRS configuration information transmitted by the base station, the LMF pre-configures a list of available DL-PRS configuration information for the UE from the PRS configuration information.

Step 4: the LMF issues LPP message 1 to the UE.

In some embodiments, before the LMF issues the LPP message 1 to the UE, the LMF has configured the corresponding PRS resource for the UE, and issues the corresponding PRS resource as part of the assistance information to the UE through the ProvideAssistanceData message.

For LPP message 1, which includes at least one of the following:

a list of available DL-PRS configuration information;

the maximum quantity of times of a PRS request initiating a PRS changes on a side of the UE; and/or configuration information of a timer related to the PRS change initiated by a side of the UE.

The range of the list of available DL-PRS configuration information includes at least one of the following:

a BWP ID corresponding to a DL-PRS resource that is available to be requested to be changed;

a positioning frequency layer ID corresponding to a DL-PRS resource that is available to be requested to be changed;

a base station ID corresponding to a DL-PRS resource that is available to be requested to be changed;

a TRP ID corresponding to a DL-PRS resource that is available to be requested to be changed;

a DL-PRS resource list ID that is available to be requested to be changed;

a DL-PRS resource ID that is available to be requested to be changed.

The DL-PRS resource configuration information that can be dynamically requested includes at least one of the following:

a list of periods of DL-PRS resource that is available to be requested to be changed;

a list of a quantity of repetitions of DL-PRS resources that is available to be requested to be changed;

a list of muting patterns of DL-PRS resources that is available to be requested to be changed.

The configuration information of the timer related to the PRS change initiated by the side of the UE includes at least one of the following:

the configuration of the interval timer between two consecutive request messages transmitted by the UE; or the configuration of the response timer after the UE transmits the DL-PRS request message.

Embodiment 2: the LMF requests the base station to reconfigure the PRS based on the PRS resource configuration request message initiated by the UE.

Step 1: the LMF transmits a DL-PRS reconfiguration message, which carries the DL-PRS configuration information requested by the UE, to the base station.

Step 2a: the base station reconfigures the corresponding PRS based on the reconfiguration message, and returns a PRS reconfiguration response message, in which indicating that the configuration of the corresponding PRS is completed by the base station, to the LMF.

Step 2b: when the base station cannot configure the PRS according to the PRS configuration information in the reconfiguration message, the base station returns a PRS reconfiguration response message, in which indicating that the base station cannot configure the configuration of the corresponding PRS, to the LMF.

Embodiment 3: the UE requests corresponding DL-PRS configuration information based on the available PRS configuration information carried in the LPP message 1.

Embodiment 3-1: when the timer is not configured on the side of the UE, the UE initiates a DL-PRS resource configuration request based on dynamically changeable PRS configuration information carried in the LPP message 1.

Step 1a: in some embodiments, the UE, based on its own channel environment condition, positioning accuracy requirement, and/or measurement result, selects a corresponding PRS resource configuration within the range of the list of the available PRS configuration information issued by the LMF, and carries the PRS resource configuration information in the DL-PRS resource configuration request message, and reports the DL-PRS resource configuration request message to the LMF. The DL-PRS resource configuration information requested by the UE includes at least one of the following:

a BWPID corresponding to a DL-PRS resource;
a positioning frequency layer ID corresponding to a DL-PRS resource;
a base station ID corresponding to a DL-PRS resource;
a TRP ID corresponding to a DL-PRS resource;
a DL-PRS resource list ID;
a DL-PRS resource ID;
a period of a DL-PRS resource;
a quantity of repetitions of a DL-PRS resource;
a muting pattern of a DL-PRS resource;
a transmission time point of a DL-PRS resource; or
a time duration of a DL-PRS resource.

Step 1b: in some embodiments, if the UE has obtained the PRS resource configured by the LMF for the UE from the LMF before requesting the configuration information of the PRS resource, the UE may carry the configuration information of the configured PRS resource which is available to be requested to be changed in the DL-PRS resource configuration request message based on the PRS configuration and report the PRS resource configuration request message to the LMF. The configuration information of the PRS resource requested by the UE to be changed may include at least one of the following:

a BWP ID corresponding to a DL-PRS resource requested to be added or subtracted;
a positioning frequency layer ID corresponding to a DL-PRS resource requested to be added or subtracted;
a base station ID corresponding to a DL-PRS resource requested to be added or subtracted;
a TRP ID corresponding to a DL-PRS resource requested to be added or subtracted;
a DL-PRS resource list ID requested to be added or subtracted;
a DL-PRS resource ID requested to be added or subtracted;
a period of a DL-PRS resource requested to be added or subtracted;
a quantity of repetitions used by a period of a DL-PRS resource requested to be added or subtracted;
a muting pattern of a DL-PRS resource requested to be added or subtracted;
a transmission time point of a DL-PRS resource requested to be added or subtracted; or
a time duration of a DL-PRS resource requested to be added or subtracted.

Step 1c: in some embodiments, the UE may also determine one optimal beam receiving direction based on its measurement result or the reception situation of the SSB, and reports the optimal beam receiving direction to the LMF through the DL-PRS resource configuration request message. The DL-PRS resource configuration request message includes at least one of the following:

a base station ID corresponding to a DL-PRS resource;
a TRP ID corresponding to a DL-PRS resource;
a resource list ID corresponding to a DL-PRS resource; or
an SSB_index corresponding to a best beam receiving direction.

Step 2: in some embodiments, after the UE transmits the DL-PRS resource configuration request message, the UE updates the quantity of times N of the PRS request on the side of the UE.

Step 3a: in some embodiments, if the LMF receives the DL-PRS resource configuration request message that is transmitted by the UE and carries the DL-PRS configuration information selected by the UE, the LMF determines whether the DL-PRS configuration information requested by the UE is in the list of DL-PRS configuration information configured by the base station and obtained by the LMF from the base station.

Step 3b: In some embodiments, (if the LMF has issued the DL-PRS resources configured for the UE to the UE through the ProvideAssistanceData message) the LMF receives the DL-PRS resource configuration request message that is transmitted by the UE and carries the DL-PRS configuration information requested to be changed; where the DL-PRS configuration information requested by the UE to be changed is at least one of the following:

a BWP ID corresponding to a DL-PRS resource requested to be added;
a positioning frequency layer ID corresponding to a DL-PRS resource requested to be added;
a base station ID corresponding to a DL-PRS resource requested to be added;
a TRP ID corresponding to a DL-PRS resource requested to be added;
a DL-PRS resource list ID requested to be added;
a DL-PRS resource ID requested to be added;
a period of a DL-PRS resource requested to be added;
a quantity of repetitions of a DL-PRS resource requested to be added;
a transmission time point of a DL-PRS resource requested to be added; or
a time duration of a DL-PRS resource requested to be added.

The LMF determines whether the DL-PRS configuration information requested by the UE to be changed is in the list of DL-PRS configuration information obtained by the LMF from the base station, after the LMF receives the DL-PRS resource configuration request message that is transmitted by the UE and carries the DL-PRS configuration information requested to be changed.

Step 3c: in some embodiments, (if the LMF has issued the DL-PRS resources configured for the UE to the UE through the ProvideAssistanceData message) the LMF receives the DL-PRS resource configuration request message that is transmitted by the UE and carries the DL-PRS configuration information requested to be changed; where the DL-PRS configuration information requested by the UE to be changed is at least one of the following:

a BWP ID corresponding to a DL-PRS resource requested to be subtracted;
a positioning frequency layer ID corresponding to a DL-PRS resource requested to be subtracted;
a base station ID corresponding to a DL-PRS resource requested to be subtracted;

a TRP ID corresponding to a DL-PRS resource requested to be subtracted;

a DL-PRS resource list ID requested to be subtracted;

a DL-PRS resource ID requested to be subtracted;

a period of a DL-PRS resource requested to be subtracted;

a quantity of repetitions of a DL-PRS resource requested to be subtracted;

a transmission time point of a DL-PRS resource requested to be subtracted; or a time duration of a DL-PRS resource requested to be subtracted.

Then the LMF first checks whether these DL-PRS resources requested by the UE to be subtracted are currently used by other positioning UEs, after the LMF receives the DL-PRS resource configuration request message that is transmitted by the UE and carries the DL-PRS configuration information requested to be changed.

Step 3d: if the LMF receives a DL-PRS resource configuration request message transmitted by the UE and including the DL-PRS beam direction requested to be changed, the LMF first checks whether the DL-PRS resource of which the beam direction is requested by the UE to be changed is currently used by other positioning UEs.

Step 4a: for steps 3a and 3b, if the DL-PRS configuration information requested by the UE is in the list of DL-PRS configuration information pre-configured by the base station and obtained by the LMF from the base station, the LMF returns a DL-PRS resource configuration request response message, in which indicating that the DL-PRS configuration information requested by the UE has been configured, to the UE.

Step 4b: for steps 3a and 3b, if the DL-PRS configuration information requested by the UE is not in the list of DL-PRS configuration information pre-configured by the base station and obtained by the LMF from the base station, the LMF transmits a DL-PRS reconfiguration message, carrying the DL-PRS configuration information requested by the UE, to the base station.

Step 4c: for steps 3c and 3d, if the LMF detects that the PRS resource requested by the UE to be changed has not been used by other positioning UEs, the LMF transmits a DL-PRS reconfiguration message, carrying the PRS configuration information requested by the UE to be changed, to the base station.

Step 4d: for steps 3c and 3d, if the LMF detects that the DL-PRS resource requested by the UE has been used by other positioning UEs, the LMF rejects the request from the UE, and returns a PRS resource configuration request response message, in which indicating the DL-PRS configuration information requested by the UE to be changed cannot be accepted, to the UE.

Step 5: for Step 4b and Step 4c, the operations in Embodiment 2 is performed.

Step 6: for Step 5, after the LMF obtains the DL-PRS reconfiguration response message from the base station:

if the DL-PRS reconfiguration response message indicates that the base station has completed the requested DL-PRS configuration, the LMF transmits a PRS resource configuration request response message to the UE, where the PRS resource configuration request response message indicates that the DL-PRS resource requested by the UE has been accepted, and/or carries the reconfigured DL-PRS resources in the PRS resource configuration request response message.

If the DL-PRS reconfiguration response message indicates that the base station cannot configure the requested DL-PRS configuration:

then the LMF transmits a PRS resource configuration request response message, which indicates that the DL-PRS resource requested by the UE is not accepted, to the UE.

Step 7: for steps 4a, 4d and 6, when the UE receives the PRS resource configuration request response message fed back by the LMF:

if the message indicates that the DL-PRS configuration information requested by the UE is accepted, the UE updates its DL-PRS configuration based on the requested DL-PRS configuration information, and performs measurements on these configured DL-PRS resources;

if the message indicates that the DL-PRS configuration information requested by the UE to be changed cannot be accepted, then:

when the quantity of times N of the PRS request is less than the maximum quantity of times of the request configured by the LMF for the UE, the UE re-initiates a new DL-PRS configuration information request process;

when the quantity of times N of the PRS request is equal to the maximum quantity of times of the request configured by the LMF for the UE, the UE performs a measurement based on the PRS in the assistance information configured by the LMF.

In some embodiments, before measuring the PRS in the assistance information configured by the LMF, the UE transmits a RequestAssistanceData message that carries no PRS configuration information to the LMF to request to obtain the PRS configured on the side of the LMF.

Embodiment 3-2: when the response timer T1 and/or the interval timer T2 is configured on the side of the UE, the UE initiates a DL-PRS resource configuration request based on the list of available PRS configuration information carried in the LPP message 1, and (when configured with the response timer T1, and before the response timer T1 expires) obtains the message fed back by the LMF.

Step 1a: in some embodiments, the UE, based on its own channel environment condition, positioning accuracy requirement, and/or measurement result, selects PRS configuration information within the range of the list of the available PRS configuration information list issued by the LMF, and carries the selected PRS configuration information in the PRS resource configuration request message (or also referred to as the DL-PRS resource configuration request message) (that is, the UE requests to configure the corresponding DL-PRS resources for the UE according to the selected PRS configuration information), and reports to LMF. The PRS configuration information selected by the UE includes at least one of the following:

a BWPID corresponding to a DL-PRS resource;

a positioning frequency layer ID corresponding to a DL-PRS resource;

a base station ID corresponding to a DL-PRS resource;

a TRP ID corresponding to a DL-PRS resource;

a DL-PRS resource list ID;

a DL-PRS resource ID;

a period of a DL-PRS resource;

a quantity of repetitions of a DL-PRS resource;

a muting pattern of a DL-PRS resource;

a transmission time point of a DL-PRS resource; or a time duration of a DL-PRS resource.

Step 1b: in some embodiments, if the UE has obtained the PRS resource configured by the LMF for the UE from the LMF before requesting the configuration information of the PRS resource, the UE may carry the configuration information of the configured PRS resource which is available to be requested to be changed in the PRS resource configuration request message based on the PRS configuration and report the PRS resource configuration request message to the LMF. The configuration information of the PRS resource requested by the UE to be changed may include at least one of the following:

a BWP ID corresponding to a DL-PRS resource requested to be added or subtracted;

a positioning frequency layer ID corresponding to a DL-PRS resource requested to be added or subtracted;

a base station ID corresponding to a DL-PRS resource requested to be added or subtracted;

a TRP ID corresponding to a DL-PRS resource requested to be added or subtracted;

a DL-PRS resource list ID requested to be added or subtracted;

a DL-PRS resource ID requested to be added or subtracted;

a period of a DL-PRS resource requested to be added or subtracted;

a quantity of repetitions used by a period of a DL-PRS resource requested to be added or subtracted;

a muting pattern of a DL-PRS resource requested to be changed;

a transmission time point of a DL-PRS resource requested to be added or subtracted; or a time duration of a DL-PRS resource requested to be added or subtracted.

Step 1c: in some embodiments, the UE may also determine one optimal beam receiving direction based on its measurement result or the reception situation of the SSB, and reports the optimal beam receiving direction to the LMF through the PRS resource configuration request message. The message includes at least one of the following:

a base station ID corresponding to a DL-PRS resource;

a TRP ID corresponding to a DL-PRS resource;

a resource list ID corresponding to a DL-PRS resource; or an SSB_index corresponding to a best beam receiving direction.

Step 2: in some embodiments, after transmitting the PRS resource configuration request message carrying the DL-PRS configuration information, the UE updates the quantity of times N of the PRS request on the side of the UE. In some embodiments, when the LPP message 1 contains the configuration information of the timer, the UE may also perform at least one of the following:

turning on the response timer T1; or turning on the request interval timer T2.

Step 3a: in some embodiments, when the LMF receives the PRS resource configuration request message carrying the DL-PRS configuration information transmitted by the UE, the LMF determines whether the DL-PRS configuration information requested by the UE is in the list of DL-PRS configuration information configured by the base station and obtained by the LMF from the base station.

Step 3b: in some embodiments, (if the LMF has issued the DL-PRS resources configured for the UE to the UE through the ProvideAssistanceData message) the LMF receives the PRS resource configuration request message that is transmitted by the UE and carries the DL-PRS configuration information requested to be changed, and the DL-PRS configuration information requested by the UE to be changed is at least one of the following:

a BWP ID corresponding to a DL-PRS resource requested to be added;

a positioning frequency layer ID corresponding to a DL-PRS resource requested to be added;

a base station ID corresponding to a DL-PRS resource requested to be added;

a TRP ID corresponding to a DL-PRS resource requested to be added;

a DL-PRS resource list ID requested to be added;

a DL-PRS resource ID requested to be added;

a period of a DL-PRS resource requested to be added;

a quantity of repetitions of a DL-PRS resource requested to be added;

a transmission time point of a DL-PRS resource requested to be added; or a time duration of a DL-PRS resource requested to be added.

The LMF determines whether the DL-PRS configuration information requested by the UE is in the list of DL-PRS configuration information configured by the base station and obtained by the LMF from the base station, after the LMF receives the PRS resource configuration request message.

Step 3c: in some embodiments, (if the LMF has issued the DL-PRS resources configured for the UE to the UE through the ProvideAssistanceData message) the LMF receives the PRS resource configuration request message that is transmitted by the UE and carries the DL-PRS configuration information requested to be changed, and the DL-PRS configuration information requested by the UE to be changed is at least one of the following:

a BWP ID corresponding to a DL-PRS resource requested to be subtracted;

a positioning frequency layer ID corresponding to a DL-PRS resource requested to be subtracted;

a base station ID corresponding to a DL-PRS resource requested to be subtracted;

a TRP ID corresponding to a DL-PRS resource requested to be subtracted;

a DL-PRS resource list ID requested to be subtracted;

a DL-PRS resource ID requested to be subtracted;

a period of a DL-PRS resource requested to be subtracted;

a quantity of repetitions of a DL-PRS resource requested to be subtracted;

a transmission time point of a DL-PRS resource requested to be subtracted; or a time duration of a DL-PRS resource requested to be subtracted.

The LMF first checks whether these DL-PRS resources requested by the UE to be subtracted are currently used by other positioning UEs, after the LMF receives the PRS resource configuration request message that is transmitted by the UE and carries the DL-PRS configuration information requested to be changed.

Step 3d: if the LMF receives the PRS resource configuration request message transmitted by the UE and including DL-PRS configuration of which the beam direction is requested to be changed, the LMF first checks whether the DL-PRS resource of which the beam direction is requested by the UE to be changed is currently used by other positioning UEs.

Step 4a: for steps 3a and 3b, if the DL-PRS configuration information requested by the UE is in the list of DL-PRS configuration information pre-configured by the base station and obtained by the LMF from the base station, the LMF returns a PRS resource configuration request response message, in which indicating that the DL-PRS configuration information requested by the UE has been configured, to the UE.

Step 4b: for steps 3a and 3b, if the DL-PRS configuration information requested by the UE is not in the list of DL-PRS configuration information pre-configured by the base station and obtained by the LMF from the base station, the LMF transmits a DL-PRS reconfiguration message carrying the DL-PRS configuration information requested by the UE, to the base station.

Step 4c: for steps 3c and 3d, if the LMF detects that the DL-PRS resource requested by the UE to be changed has not been used by other positioning UEs, the LMF transmits a DL-PRS reconfiguration message, carrying the PRS configuration information requested by the UE to be changed, to the base station.

Step 4d: for steps 3c and 3d, if the LMF detects that the DL-PRS resource requested by the UE has been used by other positioning UEs, the LMF rejects the request from the UE, and returns a PRS resource configuration request response message, in which indicating the DL-PRS configuration information requested by the UE to be changed cannot be accepted, to the UE.

Step 5: for steps 4b and 4c, the operations in Embodiment 2 is performed.

Step 6: for step 5, after the LMF obtains the DL-PRS reconfiguration response message from the base station:

if the DL-PRS reconfiguration response message indicates that the base station has completed the requested DL-PRS configuration, the LMF transmits a PRS resource configuration request response message to the UE, where the PRS resource configuration request response message indicates that the DL-PRS resource requested by the UE has been accepted, and/or carries the reconfigured DL-PRS resources;

if the DL-PRS reconfiguration response message indicates that the base station cannot configure the requested DL-PRS configuration:

then the LMF transmits a PRS resource configuration request response message, which indicates that the DL-PRS resource requested by the UE is not accepted, to the UE.

Step 7: for steps 4a, 4d and 6, after the UE receives the PRS resource configuration request response message fed back by the LMF, or when the response timer T1 is configured, and the PRS resource configuration request response message fed back by the LMF is received before the response timer T1 expires, the UE may determine whether the DL-PRS configuration information requested by the UE is accepted based on the indication in the message.

Step 8a: if the message indicates that the DL-PRS configuration information requested by the UE is accepted, the method further includes:

if the response timer T1 and the interval timer T2 are configured on the side of the UE, the UE turns off the response timer T1 and the interval timer T2, updates its DL-PRS configuration based on the requested DL-PRS configuration information, and performs a measurement on these configured DL-PRS resources;

if only the response timer T1 is configured on the side of the UE, the UE turns off the response timer T1, updates its DL-PRS configuration based on the requested DL-PRS configuration information, and performs the measurement on these configured DL-PRS resources;

if only the response timer T1 is configured on the side of the UE, the UE turns off the interval timer T2, updates its DL-PRS configuration based on the requested DL-PRS configuration information, and performs the measurement on these configured DL-PRS resources.

Step 8b: if the message indicates that the DL-PRS configuration information requested by the UE to be changed cannot be accepted, the method further includes the following cases.

Case 1: when the quantity of times N of the PRS request is less than the maximum quantity of times of the request configured by the LMF for the UE:

if the response timer T1 and the interval timer T2 are configured on the side of the UE, the UE turns off the response timer T1, and re-initiates a new DL-PRS configuration information request process after the interval timer T2 expires;

if only the response timer T1 is configured on the side of the UE, the UE turns off the response timer T1, and re-initiates a new DL-PRS configuration information request process;

if only the interval timer T2 is configured on the side of the UE, the UE re-initiates a new DL-PRS configuration information request process after the interval timer T2 expires.

Case 2: when the quantity of times N of the PRS request is equal to the maximum quantity of times of the request configured by the LMF for the UE:

A. if the response timer T1 and the interval timer T2 are configured on the side of the UE, the UE turns off the response timer T1 and the interval timer T2, and performs the measurement based on the PRS in the assistance information configured by the LMF; in some embodiments, before measuring the PRS in the assistance information configured by the LMF, the UE transmits a RequestAssistanceData message that carries no PRS configuration information to the LMF to request to obtain the PRS configured on the side of the LMF;

B. If only the response timer T1 is configured on the side of the UE, the UE turns off the response timer T1, and performs the measurement based on the PRS in the assistance information configured by the LMF; in some embodiments, before measuring the PRS in the assistance information configured by the LMF, the UE transmits a RequestAssistanceData message that carries no PRS configuration information to the LMF to request to obtain the PRS configured on the side of the LMF;

C. If only the interval timer T2 is configured on the side of the UE, the UE turns off the interval timer T2, and performs the measurement based on the PRS in the assistance information configured by the LMF; in some embodiments, before measuring the PRS in the assistance information configured by the LMF, the UE transmits a RequestAssistanceData message that carries no PRS configuration information to the LMF to request to obtain the PRS configured on the side of the LMF.

Embodiment 3-3: the side of the UE is configured with a response timer T1, but obtains no message fed back by the LMF before the response timer T1 expires.

Step 1a: in some embodiments, the UE, based on its own channel environment condition, positioning accuracy requirement, and/or measurement result, selects a corresponding PRS resource configuration within the range of the list of the available PRS configuration information issued by the LMF, and carries the PRS resource configuration information in the PRS resource configuration request message, and reports the DL-PRS resource configuration request message to the LMF. The DL-PRS resource configuration information requested by the UE includes at least one of the following:

a BWPID corresponding to a DL-PRS resource;

a positioning frequency layer ID corresponding to a DL-PRS resource;

a base station ID corresponding to a DL-PRS resource;

a TRP ID corresponding to a DL-PRS resource;

a DL-PRS resource list ID;

a DL-PRS resource ID;

a period of a DL-PRS resource;

a quantity of repetitions of a DL-PRS resource;

a muting pattern of a DL-PRS resource;

a transmission time point of a DL-PRS resource; or a time duration of a DL-PRS resource.

Step 1b: in some embodiments, if the UE has obtained the PRS resource configured by the LMF for the UE from the LMF before requesting the configuration information of the PRS resource, the UE may carry the configuration information of the configured PRS resource which is available to be requested to be changed in the PRS resource configuration request message based on the PRS configuration and report the PRS resource configuration request message to the LMF. The configuration information of the PRS resource requested by the UE to be changed may include at least one of the following:

a BWP ID corresponding to a DL-PRS resource requested to be added or subtracted;

a positioning frequency layer ID corresponding to a DL-PRS resource requested to be added or subtracted;

a base station ID corresponding to a DL-PRS resource requested to be added or subtracted;

a TRP ID corresponding to a DL-PRS resource requested to be added or subtracted;

a DL-PRS resource list ID requested to be added or subtracted;

a DL-PRS resource ID requested to be added or subtracted;

a period of a DL-PRS resource requested to be added or subtracted;

a quantity of repetitions used by a period of a DL-PRS resource requested to be added or subtracted;

a muting pattern of a DL-PRS resource requested to be changed;

a transmission time point of a DL-PRS resource requested to be added or subtracted; or a time duration of a DL-PRS resource requested to be added or subtracted.

Step 1c: in some embodiments, the UE may also determine one optimal beam receiving direction based on its measurement result or the reception situation of the SSB, and reports it to the LMF through the DL-PRS resource configuration request message. The message includes at least one of the following:

a base station ID corresponding to a DL-PRS resource;

a TRP ID corresponding to a DL-PRS resource;

a resource list ID corresponding to a DL-PRS resource; or an SSB_index corresponding to a best beam receiving direction.

Step 2: in some embodiments, after transmitting the PRS resource configuration request message carrying the DL-PRS configuration information, the UE updates the quantity of times N of the PRS request on the side of the UE, starts the response timer T1. In some embodiments, when the LPP message 1 contains the configuration information of the timer, the UE may also start the request interval timer T2.

Step 3a: in some embodiments, when the LMF receives the PRS resource configuration request message carrying the DL-PRS configuration information transmitted by the UE, the LMF determines whether the DL-PRS configuration information requested by the UE is in the list of DL-PRS configuration information configured by the base station and obtained by the LMF from the base station.

Step 3b: in some embodiments, (if the LMF has issued the DL-PRS resources configured for the UE to the UE through the ProvideAssistanceData message) the LMF receives the PRS resource configuration request message that is transmitted by the UE and carries the DL-PRS configuration information requested to be changed, and the DL-PRS configuration information requested by the UE to be changed is at least one of the following:

a BWP ID corresponding to a DL-PRS resource requested to be added;

a positioning frequency layer ID corresponding to a DL-PRS resource requested to be added;

a base station ID corresponding to a DL-PRS resource requested to be added;

a TRP ID corresponding to a DL-PRS resource requested to be added;

a DL-PRS resource list ID requested to be added;

a DL-PRS resource ID requested to be added;

a period of a DL-PRS resource requested to be added;

a quantity of repetitions of a DL-PRS resource requested to be added;

a transmission time point of a DL-PRS resource requested to be added; or a time duration of a DL-PRS resource requested to be added.

Then the LMF determines whether the DL-PRS configuration information requested by the UE is in the list of DL-PRS configuration information configured by the base station and obtained by the LMF from the base station.

Step 3c: in some embodiments, (if the LMF has issued the DL-PRS resources configured for the UE to the UE through the ProvideAssistanceData message) the LMF receives the PRS resource configuration request message that is transmitted by the UE and carries the DL-PRS configuration information requested to be changed, and the DL-PRS configuration information requested by the UE to be changed is at least one of the following:

a BWP ID corresponding to a DL-PRS resource requested to be subtracted;

a positioning frequency layer ID corresponding to a DL-PRS resource requested to be subtracted;

a base station ID corresponding to a DL-PRS resource requested to be subtracted;

a TRP ID corresponding to a DL-PRS resource requested to be subtracted;

a DL-PRS resource list ID requested to be subtracted;

a DL-PRS resource ID requested to be subtracted;

a period of a DL-PRS resource requested to be subtracted;

a quantity of repetitions of a DL-PRS resource requested to be subtracted;

a transmission time point of a DL-PRS resource requested to be subtracted; or a time duration of a DL-PRS resource requested to be subtracted.

Then the LMF first checks whether these DL-PRS resources requested by the UE to be subtracted are currently used by other positioning UEs.

Step 3d: if the LMF receives the PRS resource configuration request message transmitted by the UE and including DL-PRS configuration of which the beam direction is requested to be changed, the LMF first checks whether the DL-PRS resource of which the beam direction is requested by the UE to be changed is currently used by other positioning UEs.

Step 4a: for steps 3a and 3b, if the DL-PRS configuration information requested by the UE is in the list of DL-PRS configuration information pre-configured by the base station and obtained by the LMF from the base station, the LMF returns a PRS resource configuration request response message, in which indicating that the DL-PRS configuration information requested by the UE has been configured, to the UE.

Step 4b: for steps 3a and 3b, if the DL-PRS configuration information requested by the UE is not in the list of DL-PRS configuration information pre-configured by the base station and obtained by the LMF from the base station, the LMF transmits a DL-PRS reconfiguration message carrying the DL-PRS configuration information requested by the UE, to the base station.

Step 4c: for steps 3c and 3d, if the LMF detects that the DL-PRS resource requested by the UE to be changed has not been used by other positioning UEs, the LMF transmits a DL-PRS reconfiguration message, which carries the DL-PRS configuration requested by the UE to be changed, to the base station.

Step 4d: for steps 3c and 3d, if the LMF detects that the DL-PRS resource requested by the UE has been used by other positioning UEs, the LMF rejects the request from the UE, and returns a PRS resource configuration request response message, in which indicating the DL-PRS configuration information requested by the UE to be changed cannot be accepted, to the UE.

Step 5: for steps 4b and 4c, the operations in Embodiment 2 is performed.

Step 6: for step 5, after the LMF obtains the DL-PRS reconfiguration response message from the base station:

if the DL-PRS reconfiguration response message indicates that the base station has completed the requested DL-PRS configuration, the LMF transmits a PRS resource configuration request response message to the UE, where the PRS resource configuration request response message indicates that the DL-PRS resource requested by the UE has been accepted, and/or carries the reconfigured DL-PRS resources;

if the DL-PRS reconfiguration response message indicates that the base station cannot configure the requested DL-PRS configuration, then the LMF transmits a PRS resource configuration request response message, which indicates that the DL-PRS resource requested by the UE is not accepted, to the UE.

Step 7: for steps 4a, 4d and 6, if the UE receives no PRS resource configuration request response message fed back by the LMF before the timer T1 expires, the UE determines whether the quantity of times N of the PRS request is less than the maximum quantity of times of the request configured by the LMF for the UE.

Step 8a: if the quantity of times N of the PRS request is less than the maximum quantity of times of the request configured by the LMF for the UE, the method further includes:

If the interval timer T2 is configured on the side of the UE, the UE waits until the interval timer T2 expires and then re-initiates a new DL-PRS configuration information request process;

If the interval timer T2 is not configured on the side of the UE, the UE re-initiates a new DL-PRS configuration information request process.

Step 8a: if the quantity of times N of the PRS request is equal to the maximum quantity of times of the request configured by the LMF for the UE, the method further includes:

if the interval timer T2 is configured on the side of the UE, the UE turns off the interval timer T2, and performs the measurement based on the PRS in the assistance information configured by the LMF.

In some embodiments, before measuring the PRS in the assistance information configured by the LMF, the UE transmits a RequestAssistanceData message that carries no PRS configuration information to the LMF to request to obtain the PRS configured on the side of the LMF.

If the interval timer T2 is not configured on the side of the UE, the UE perform the measurements based on the PRS in the assistance information configured by the LMF for the UE.

In some embodiments, before measuring the PRS in the assistance information configured by the LMF, the UE transmits a RequestAssistanceData message that carries no PRS configuration information to the LMF to request to obtain the PRS configured on the side of the LMF.

To sum up, in the embodiments of the present disclosure, the UE triggers the method of PRS configuration change based on its own requirement which is combined with the list of available PRS configuration information pre-configured by the LMF, and may further be combined with the maximum quantity of times the UE triggers the PRS change, and/or the configuration information of the timer related to the PRS configuration change triggered by the UE, to flexibly and dynamically configure the DL-PRS according to the requirement of the UE, to improve the network efficiency and ensure the positioning accuracy.

On a side of a UE, referring to FIG. 4, a method for determining a PRS resource provided by an embodiment of the present disclosure includes:

S101, obtaining a list of available PRS configuration information pre-configured by an LMF; and S102, transmitting a PRS resource configuration request to the LMF based on the list of available PRS configuration information pre-configured by the LMF.

In the method in the embodiment of the present disclosure, the UE obtains the list of available PRS configuration information pre-configured by the LMF; and based on the list of available PRS configuration information pre-configured by the LMF, the PRS resource configuration request is transmitted to the LMF, to realize DL-PRS can be configured flexibly and dynamically according to the requirement of the UE, improving the network efficiency and ensuring the positioning accuracy.

On a side of an LMF, referring to FIG. 5, a method for determining a PRS resource provided by an embodiment of the present disclosure includes:

S201, the LMF transmits an LPP message to a UE; and

S202, the LMF receives a PRS resource configuration request message transmitted by the UE.

On a side of a base station, referring to FIG. 6, a method for determining a PRS resource provided by an embodiment of the present disclosure includes:

S301, the base station receives a DL-PRS reconfiguration message carrying PRS configuration information transmitted by an LMF; and S302, the base station obtains DL-PRS configuration information requested by a UE from the DL-PRS reconfiguration message, where the DL-PRS configuration information is from a PRS resource configuration request transmitted by the UE to the LMF based on a list of PRS configuration information pre-configured by the LMF.

Figure 7:
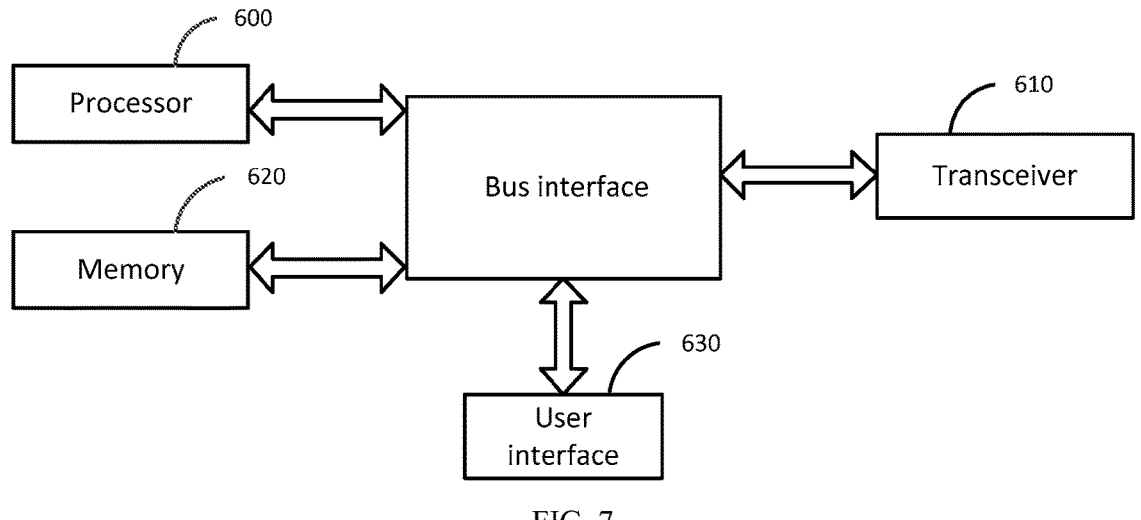
FIG. 7 is a schematic structural diagram of a device for determining PRS configuration information on a side of a UE provided by an embodiment of the present disclosure.

On a side of a UE, referring to FIG. 7, a device for determining a PRS resource provided by an embodiment of the present disclosure includes:

a memory 620, configured for storing program instructions; and a processor 600, configured for calling the program instructions stored in the memory, and according to an obtained program:

obtaining a list of available PRS configuration information pre-configured by an LMF; and transmitting a PRS resource configuration request to the LMF based on the list of available PRS configuration information pre-configured by the LMF;

the device further includes a transceiver 610, configured for receiving and transmitting data under a control of the processor 600.

In FIG. 7, the bus architecture may include any quantity of interconnected buses and bridges, in particular one or more processors represented by the processor 600 and various circuits of the memory represented by the memory 620 link together. The bus architecture may also link together various other circuits, such as peripherals, voltage regulators, and power management circuits, which are well known in the art and, therefore, will not be described further herein. The bus interface provides the interface. The transceiver 610 may be multiple elements, i.e., including a transmitter and a receiver, that provide a means for communicating with various other devices over a transmission medium. For different user equipments, the user interface 630 may also be an interface capable of externally or internally connecting the required equipment, and the connected equipment includes but is not limited to a keypad, a display, a speaker, a microphone, a joystick, and the like.

The processor 600 is responsible for managing the bus architecture and general processing, and the memory 620 may store data used by the processor 600 in performing operations.

In some embodiments, the processor 600 may be a CPU (central processor), an ASIC (Application Specific Integrated Circuit), an FPGA (Field-Programmable Gate Array) or a CPLD (Complex Programmable Logic Device).

Figure 8:
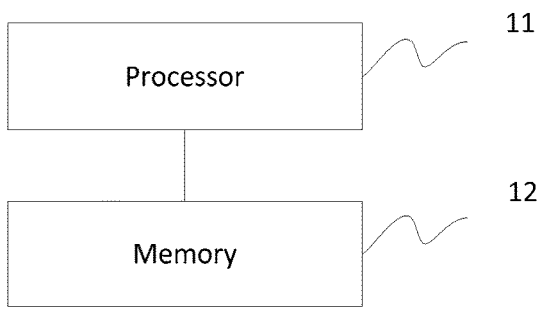
FIG. 8 is a schematic structural diagram of a device for determining PRS configuration information on a side of an LMF according to an embodiment of the present disclosure.

On a side of an LMF, referring to FIG. 8, a device for determining a PRS resource provided by an embodiment of the present disclosure includes:

a memory 11, configured for storing program instructions; and a processor 12, configured for calling the program instructions stored in the memory, and according to an obtained program:

transmitting an LPP message to a UE; and receiving a PRS resource configuration request message transmitted by the UE.

In FIG. 8, the bus architecture may include any quantity of interconnected buses and bridges, in particular one or more processors represented by the processor 12 and various circuits of the memory represented by the memory 11 link together. The bus architecture may also link together various other circuits, such as peripherals, voltage regulators, and power management circuits, which are well known in the art and, therefore, will not be described further herein. The bus interface provides the interface.

The processor 12 is responsible for managing the bus architecture and general processing, and the memory 11 may store data used by the processor 12 in performing operations.

In some embodiments, the processor 12 may be a CPU (central processor), an ASIC (Application Specific Integrated Circuit), an FPGA (Field-Programmable Gate Array) or a CPLD (Complex Programmable Logic Device).

Figure 9:
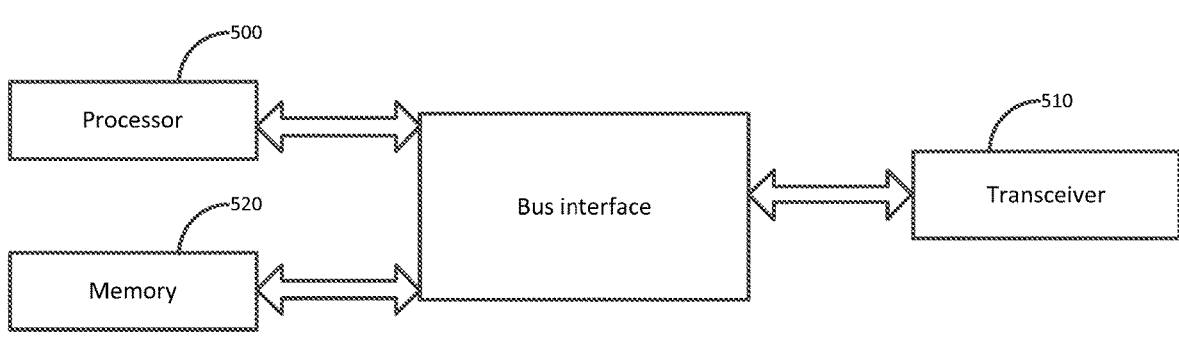
FIG. 9 is a schematic structural diagram of a device for determining PRS configuration information on a side of a base station according to an embodiment of the present disclosure.

On a side of a base station, referring to FIG. 9, a device for determining a PRS resource provided by an embodiment of the present disclosure includes:

a memory 520, configured for storing program instructions;

a processor 500, for calling the program instructions stored in the memory, and according to an obtained program:

receiving a DL-PRS reconfiguration message carrying PRS configuration information transmitted by an LMF;

obtaining DL-PRS configuration information requested by a user equipment from the DL-PRS reconfiguration message, where the DL-PRS configuration information is from a PRS resource configuration request transmitted by the user equipment to the LMF based on a list of PRS configuration information pre-configured by the LMF; and the device further includes a transceiver 510, configured for receiving and transmitting data under a control of the processor 500.

In FIG. 9, the bus architecture may include any quantity of interconnected buses and bridges, in particular one or more processors represented by the processor 500 and various circuits of memory represented by memory 520 are linked together. The bus architecture may also link together various other circuits, such as peripherals, voltage regulators, and power management circuits, which are well known in the art and, therefore, will not be described further herein. The bus interface provides the interface. The transceiver 510 may be multiple elements, i.e., including a transmitter and a receiver, that provide a means for communicating with various other devices over a transmission medium. The processor 500 is responsible for managing the bus architecture and general processing, and the memory 520 may store data used by the processor 500 in performing operations.

The processor 500 may be a central processor (CPU), an application specific integrated circuit (ASIC), a field-programmable gate array (FPGA) or a complex programmable logic device (CPLD).

Figure 10:
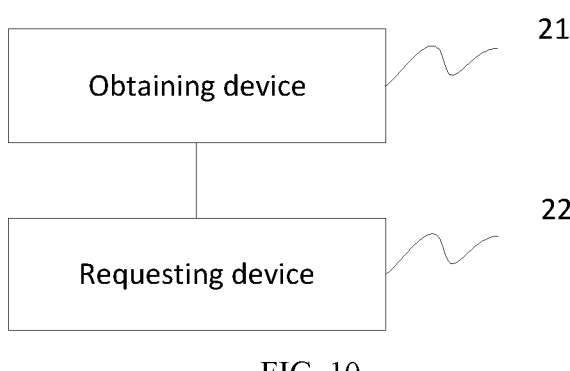
FIG. 10 is a schematic structural diagram of another device for determining PRS configuration information on a side of a UE provided by an embodiment of the present disclosure.

On a side of a UE, referring to FIG. 10, another device for determining a PRS resource provided by an embodiment of the present disclosure includes:

an obtaining device 21, configured to obtain a list of available PRS configuration information pre-configured by an LMF; and a requesting device 22, configured to transmit a PRS resource configuration request to the LMF based on the list of available PRS configuration information pre-configured by the LMF.

Figure 11:
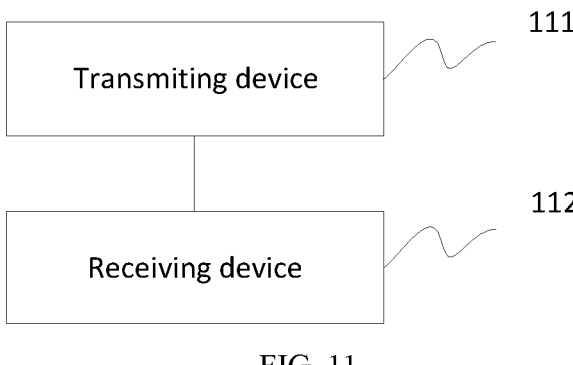
FIG. 11 is a schematic structural diagram of another device for determining PRS configuration information on a side of an LMF according to an embodiment of the present disclosure.

On a side of an LMF, referring to FIG. 11, another device for determining a PRS resource provided by an embodiment of the present disclosure includes:

a transmitting device 111, configured to transmit an LPP message to a UE; and a receiving device 112 is configured to receive a PRS resource configuration request message transmitted by the UE.

Figure 12:
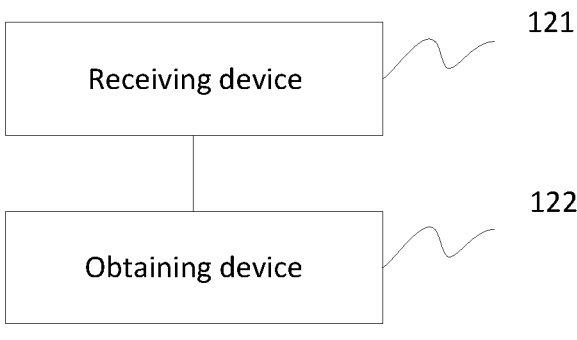
FIG. 12 is a schematic structural diagram of another device for determining PRS configuration information on a side of a base station according to an embodiment of the present disclosure.

On a side of a base station, referring to FIG. 12, another device for determining a PRS resource provided by an embodiment of the present disclosure includes:

a receiving device 121, configured to receive a DL-PRS reconfiguration message carrying PRS configuration information transmitted by an LMF; and an obtaining device 122 is configured to obtain DL-PRS configuration information requested by a user equipment from the DL-PRS reconfiguration message, where the DL-PRS configuration information is from a PRS resource configuration request transmitted by the user equipment to the LMF based on a list of PRS configuration information pre-configured by the LMF.

It should be noted that the division of devices in the embodiments of the present disclosure is illustrative, and is only a logical function division, and other division modes may be used in actual implementation. In addition, each functional device in each embodiment of the present disclosure may be integrated into one processing device, or each device may exist physically alone, or two or more devices may be integrated into one device. The above-mentioned integrated devices may be implemented in the form of hardware, or may be implemented in the form of software functional units.

The integrated device, if implemented in the form of a software functional device and sold or used as an independent product, may be stored in a computer-readable storage medium. Based on this understanding, the embodiments of the present disclosure, or the parts that contribute to the prior art, or all or part of the embodiments can be embodied in the form of software products in essence, and the computer software products are stored in a storage medium, including several instructions for causing a computer device (which may be a personal computer, a server, or a network device, etc.) or a processor to execute all or part of the steps of the methods described in the various embodiments of the present disclosure. The aforementioned storage medium includes: a U disk, a mobile hard disk, a read-only memory (ROM), a random access memory (RAM), a magnetic disk or an optical disk and other medium that can store program codes.

An embodiment of the present disclosure provides a computing device, and the computing device may be a desktop computer, a portable computer, a smart phone, a tablet computer, a personal digital assistant (PDA), and the like. The computing device may include a central processing unit (CPU), a memory, an input/output device, etc., the input device may include a keyboard, a mouse, a touch screen, etc., and the output device may include a display device, such as a liquid crystal display (LCD), a cathode ray tube (CRT), etc.

The memory may include a read only memory (ROM) and a random access memory (RAM) and provide the processor with program instructions and data stored in the memory. In the embodiments of the present disclosure, the memory may be used to store the program of any of the methods provided in the embodiments of the present disclosure.

The processor calls the program instructions stored in the memory, and the processor is configured to execute any one of the methods provided in the embodiments of the present disclosure according to the obtained program instructions.

An embodiment of the present disclosure provides a computer storage medium for storing computer program instructions used for the device provided by the above embodiment of the present disclosure, which includes a program for executing any of the methods provided by the above embodiment of the present disclosure.

The computer storage medium can be any available medium or data storage device that can be accessed by a computer, including but not limited to a magnetic storage (e.g., a floppy disk, a hard disk, a magnetic tape, a magneto-optical disk (MO), etc.), an optical storage (e.g., a CD, a DVD, a BD, an HVD, etc.), and a semiconductor memory (e.g., a ROM, an EPROM, an EEPROM, a non-volatile memory (NAND FLASH), a solid-state disk (SSD)), and the like.

The processing flow of the above method can be implemented by a software program, and the software program can be stored in the storage medium, and when the stored software program is called, the above method steps are executed.

The embodiments of the present disclosure may be provided as a method, a system, or a computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage medium (including but not limited to a disk storage, an optical storage, and the like) having computer-usable program code embodied therein.

The present disclosure is described with reference to flowchart illustrations and/or block diagrams of methods, apparatus (systems), and computer program products according to embodiments of the present disclosure. It will be understood that each flow and/or block in the flowchart illustrations and/or block diagrams, and combinations of flows and/or blocks in the flowchart illustrations and/or block diagrams, can be implemented by computer program instructions. These computer program instructions may be provided to the processor of a general purpose computer, a special purpose computer, an embedded processor or other programmable data processing device to produce a machine, and the instructions executed by the processor of the computer or other programmable data processing device produce devices for implementing the functions specified in a flow or flow of a flowchart and/or a block or blocks of a block diagram.

These computer program instructions may also be stored in a computer-readable memory capable of directing a computer or other programmable data processing apparatus to function in a particular manner, and the instructions stored in the computer-readable memory result in an article of manufacture including instruction devices, the instructions device implements the functions specified in one or more flows of the flowchart and/or one or more blocks of the block diagrams.

These computer program instructions can also be loaded on a computer or other programmable data processing device to cause a series of operational steps to be performed on the computer or other programmable device to produce a computer-implemented process, and the instructions performed on the computer or other programmable device provide steps for implementing the functions specified in the one or more flows of the flowcharts and/or one or more blocks of the block diagrams.

What is claimed is:

1. A method for determining a positioning reference signal, PRS, resource, comprising:

obtaining a list of available PRS configuration information pre-configured by a location management function, LMF; and transmitting a PRS resource configuration request to the LMF based on the list of available PRS configuration information pre-configured;

wherein after transmitting the PRS resource configuration request to the LMF, the method further comprises performing at least one or more of following operations:

updating a quantity of times of initiating the PRS resource configuration request to the LMF; or turning on a timer according to configuration information of the timer transmitted by the LMF, wherein the timer comprises a first timer and/or a second timer;

wherein in a condition that the first timer is not turn on, and/or, in a condition that the first timer is turn on, and a PRS resource configuration request response message returned by the LMF is received before the first timer expires, the method further comprises:

in a condition that DL-PRS configuration information configured to indicate a user equipment requests in the PRS resource configuration request response message is accepted, performing one or more of following operations:

turning off the first timer;

turning off the second timer; or updating DL-PRS configuration of the user equipment based on the DL-PRS configuration information requested, and performing a measurement on a DL-PRS resource of the updated DL-PRS configuration;

in a condition that DL-PRS configuration information configured to indicate a user equipment request changes in the PRS resource configuration request response message is not accepted, performing at least one or more of following operations:

waiting for the second timer expires, and re-initiating the PRS resource configuration request after the second timer expires;

turning off the first timer;

re-initiating the PRS resource configuration request;

turning off the second timer, and initiating an assistance information request process to the LMF; or initiating an assistance information request process to the LMF;

or, wherein in a condition that the first timer is turn on, and a PRS resource configuration request response message returned by the LMF is not received before the first timer expires, performing at least one or more of following operations:

waiting for the second timer expires, and re-initiating the PRS resource configuration request after the second timer expires;

re-initiating the PRS resource configuration request;

turning off the second timer, and initiating an assistance information request process to the LMF; or initiating an assistance information request process to the LMF.

2. The method according to claim 1, wherein the PRS resource configuration request transmitted to the LMF comprises at least one or more of following:

PRS configuration information selected by a user equipment based on the list of available PRS configuration information pre-configured;

configuration information of a PRS resource requested for change, determined by a user equipment based on the list of available PRS configuration information pre-configured and a PRS resource obtained from the LMF; or configuration information related to a beam direction of a downlink positioning reference signal, DL-PRS, resource.

3. The method according to claim 2, wherein the PRS configuration information selected by the user equipment comprises at least one or more of following:

a bandwidth part, BWP, identity document, ID corresponding to a DL-PRS resource;

a positioning frequency layer ID corresponding to a DL-PRS resource;

a base station ID corresponding to a DL-PRS resource;

a transmission reception point, TRP, ID corresponding to a DL-PRS resource;

a DL-PRS resource list ID;

a DL-PRS resource ID;

a period of a DL-PRS resource;

a quantity of repetitions used by a period of a DL-PRS resource;

a muting pattern of a DL-PRS resource;

a transmission time point of a DL-PRS resource; or a time duration of a DL-PRS resource.

4. The method according to claim 2, wherein the configuration information of the PRS resource requested for change comprises at least one or more of following:

a BWP ID corresponding to a DL-PRS resource requested to be added or subtracted;

a positioning frequency layer ID corresponding to a DL-PRS resource requested to be added or subtracted;

a base station ID corresponding to a DL-PRS resource requested to be added or subtracted;

a TRP ID corresponding to a DL-PRS resource requested to be added or subtracted;

a DL-PRS resource list ID requested to be added or subtracted;

a DL-PRS resource ID requested to be added or subtracted;

a period of a DL-PRS resource requested to be added or subtracted;

a quantity of repetitions used by a period of a DL-PRS resource requested to be added or subtracted;

a muting pattern of a DL-PRS resource requested to be changed;

a transmission time point of a DL-PRS resource requested to be added or subtracted; or a time duration of a DL-PRS resource requested to be added or subtracted.

5. The method according to claim 2, wherein the configuration information related to the beam direction of a DL-PRS resource comprises at least one or more of following:

a base station ID corresponding to a DL-PRS resource;

a TRP ID corresponding to a DL-PRS resource;

a resource list ID corresponding to a DL-PRS resource; or a synchronization signal and physical broadcast channel block index, SSB_index, corresponding to a best beam receiving direction.

6. A device for determining a positioning reference signal, PRS, resource, comprising:

a memory, configured to store program instructions; and a processor, configured to call the program instructions stored in the memory, and execute the method of claim 1 according to obtained program instructions.

7. A method for determining a positioning reference signal, PRS, resource, comprising:

transmitting, by a location management function, LMF, a long term evolution location protocol, LPP, message to a user equipment; and receiving, by the LMF, a PRS resource configuration request message transmitted by the user equipment;

wherein the LPP message comprises configuration information of a timer related to a PRS change initiated by a side of the user equipment, such that after the user equipment transmits the PRS resource configuration request to the LMF, the UE further performs at least one or more of following operations:

updating a quantity of times of initiating the PRS resource configuration request to the LMF; or turning on a timer according to configuration information of the timer transmitted by the LMF; wherein the timer comprises a first timer and/or a second timer;

wherein the configuration information of the timer related to the PRS change initiated by the side of the user equipment comprises at least one or more of following:

configuration information of a first timer, wherein the first timer is a response timer after the user equipment transmits the PRS resource configuration request message; or configuration information of a second timer, wherein the second timer is an interval timer between two consecutive PRS resource configuration request messages transmitted by the user equipment;

wherein in a condition that the first timer is not turn on, and/or, in a condition that the first timer is turn on, and a PRS resource configuration request response message returned by the LMF is received before the first timer expires, the method performed by the UE further comprises:

in a condition that DL-PRS configuration information configured to indicate user equipment requests in the PRS resource configuration request response message is accepted, performing one or more of following operations:

turning off the first timer;

turning off the second timer; or updating DL-PRS configuration of the user equipment based on the DL-PRS configuration information requested, and performing a measurement on a DL-PRS resource of the updated DL-PRS configuration;

in a condition that DL-PRS configuration information configured to indicate a user equipment request changes in the PRS resource configuration request response message is not accepted, performing at least one or more of following operations:

waiting for the second timer expires, and re-initiating the PRS resource configuration request after the second timer expires;

turning off the first timer;

re-initiating the PRS resource configuration request;

turning off the second timer, and initiating an assistance information request process to the LMF; or initiating an assistance information request process to the LMF;

or, wherein in a condition that the first timer is turn on, and a PRS resource configuration request response message returned by the LMF is not received before the first timer expires, performing at least one or more of following operations:

waiting for the second timer expires, and re-initiating the PRS resource configuration request after the second timer expires;

re-initiating the PRS resource configuration request;

turning off the second timer, and initiating an assistance information request process to the LMF; or initiating an assistance information request process to the LMF.

8. The method according to claim 7, wherein the LPP message comprises at least one of following:

a pre-configured list of available PRS configuration information;

a maximum quantity of times of a PRS request initiating a PRS change on a side of the user equipment; or configuration information of a timer related to a PRS change initiated by a side of the user equipment.

9. The method according to claim 8, wherein the pre-configured list of available PRS configuration information is configured for the user equipment to initiate a dynamic PRS request, and comprises at least one or more of following:

a bandwidth part, BWP, identity document, ID, corresponding to an available downlink positioning reference signal, DL-PRS, resource;

a positioning frequency layer ID corresponding to an available DL-PRS resources;

a base station ID corresponding to an available DL-PRS resource;

a transmission reception point, TRP, ID corresponding to an available DL-PRS resource;

an available DL-PRS resource list ID;

an available DL-PRS resource ID;

a list of periods of available DL-PRS resources;

a list of a quantity of repetitions of available DL-PRS resources; or a list of muting patterns of available DL-PRS resources.

10. The method according to claim 8, wherein the configuration information of the timer related to the PRS change initiated by the side of the user equipment comprises at least one or more of following:

configuration information of a first timer, wherein the first timer is a response timer after the user equipment transmits the PRS resource configuration request message; or configuration information of a second timer, wherein the second timer is an interval timer between two consecutive PRS resource configuration request messages transmitted by the user equipment.

11. The method according to claim 7, wherein the PRS resource configuration request message received by the LMF from the user equipment comprises DL-PRS configuration information selected by the user equipment;

wherein the method further comprises:

returning, by the LMF, a PRS resource configuration request response message to the user equipment, in a condition that the DL-PRS configuration information requested by the user equipment is in a list of DL-PRS configuration information pre-configured by a base station and obtained by the LMF from the base station, wherein the PRS resource configuration request response message carries an indication that the DL-PRS configuration information requested by the user equipment has been configured;

transmitting, by the LMF, a DL-PRS reconfiguration message to the base station, in a condition that the DL-PRS configuration information requested by the user equipment is not in the list of DL-PRS configuration information pre-configured by the base station and obtained by the LMF from the base station, wherein the DL-PRS reconfiguration message carries the DL-PRS configuration information requested by the user equipment.

12. The method according to claim 7, wherein the PRS resource configuration request message received by the LMF from the user equipment comprises: DL-PRS configuration information requested by the user equipment to be changed; wherein the DL-PRS configuration information requested to be changed comprises at least one or more of following:

a BWP ID corresponding to a DL-PRS resource requested to be added;

a positioning frequency layer ID corresponding to a DL-PRS resource requested to be added;

a base station ID corresponding to a DL-PRS resource requested to be added;

a TRP ID corresponding to a DL-PRS resource requested to be added;

a DL-PRS resource list ID requested to be added;

a DL-PRS resource ID requested to be added;

a period of a DL-PRS resource requested to be added;

a quantity of repetitions of a DL-PRS resource requested to be added;

a transmission time point of a DL-PRS resource requested to be added; or a time duration of a DL-PRS resource requested to be added;

wherein the method further comprises:

returning a PRS resource configuration request response message to the user equipment, in a condition that the DL-PRS configuration information requested by the user equipment to be changed is in a list of DL-PRS configuration information pre-configured by a base station and obtained by the LMF from the base station, wherein the PRS resource configuration request response message carries an indication that the DL-PRS configuration information requested by the user equipment to be changed has been configured;

transmitting a DL-PRS reconfiguration message to the base station, in a condition that the DL-PRS configuration information requested by the user equipment to be changed is not in the list of DL-PRS configuration information pre-configured by the base station and obtained by the LMF from the base station, wherein the DL-PRS reconfiguration message carries the DL-PRS configuration information requested by the user equipment to be changed;

or, wherein the PRS resource configuration request message received by the LMF from the user equipment comprises: DL-PRS configuration information requested by the user equipment to be changed;

wherein the DL-PRS configuration information requested to be changed comprises at least one or more of following:

a BWP ID corresponding to a DL-PRS resource requested to be subtracted;

a positioning frequency layer ID corresponding to a DL-PRS resource requested to be subtracted;

a base station ID corresponding to a DL-PRS resource requested to be subtracted;

a TRP ID corresponding to a DL-PRS resource requested to be subtracted;

a DL-PRS resource list ID requested to be subtracted;

a DL-PRS resource ID requested to be subtracted;

a period of a DL-PRS resource requested to be subtracted;

a quantity of repetitions of a DL-PRS resource requested to be subtracted;

a transmission time point of a DL-PRS resource requested to be subtracted; or a time duration of a DL-PRS resource requested to be subtracted;

wherein the method further comprises:

returning a PRS resource configuration request response message to the user equipment, in a condition that a DL-PRS resource requested by the user equipment to be changed is currently used by other positioning user equipment; wherein the PRS resource configuration request response message carries an indication that the DL-PRS configuration information requested by the user equipment to be changed is not accepted;

transmitting a DL-PRS reconfiguration message to the base station, in a condition that the DL-PRS resource requested by the user equipment to be changed is not currently used by other positioning user equipment; wherein the DL-PRS reconfiguration message carries the DL-PRS configuration information requested by the user equipment to be changed.

13. The method according to claim 7, wherein the PRS resource configuration request message received by the LMF from the user equipment comprises configuration information related to a beam direction of a DL-PRS;

wherein the method further comprises:

transmitting a PRS resource configuration request response message to the user equipment, in a condition that a DL-PRS resource of which a beam direction is requested by the user equipment to be changed is currently used by other positioning user equipments, wherein the PRS resource configuration request response message carries an indication that configuration information related to a beam direction of a DL-PRS resource of the user equipment is not accepted;

transmitting a DL-PRS reconfiguration message to the base station, in a condition that the DL-PRS resource of which a beam direction is requested by the user equipment to be changed is not currently used by other positioning user equipments, wherein the DL-PRS reconfiguration message carries configuration information related to a beam direction of a DL-PRS resource requested by the user equipment.

14. The method according to claim 7, further comprising:

receiving, by the LMF, a reconfiguration response message fed back by the base station, wherein the reconfiguration response message is a response of the base station to the DL-PRS reconfiguration message;

transmitting, by the LMF, a PRS resource configuration request response message to the user equipment, in a condition that the reconfiguration response message fed back by the base station indicates that a request is accepted, wherein the PRS resource configuration request response message carries an indication that a DL-PRS resource requested by the user equipment has been accepted, and/or reconfigured configuration information of a DL-PRS resource;

transmitting, by the LMF, a PRS resource configuration request response message to the user equipment, in a condition that the reconfiguration response message fed back by the base station indicates that a request is rejected, wherein the PRS resource configuration request response message carries an indication that a DL-PRS resource requested by the user equipment is not accepted.

15. A device for determining a positioning reference signal, PRS, resource, comprising:

a memory, configured to store program instructions; and a processor, configured to call the program instructions stored in the memory, and execute the method of claim 7 according to obtained program instructions.

* * * * *